United States Patent [19]

Johanning et al.

[11] 4,321,278

[45] Mar. 23, 1982

[54] ANIMAL FEEDSTUFFS AND PROCESS

[75] Inventors: Gary L. Johanning; Merle E. Muhrer, both of Columbia; Herschel J. Gaddy, St. Joseph, all of Mo.

[73] Assignee: The Curators of the University of Missouri, Columbia, Mo.

[21] Appl. No.: 54,458

[22] Filed: Jul. 3, 1979

[51] Int. Cl.³ .............................................. A23K 1/22
[52] U.S. Cl. ..................................... 426/69; 426/636; 426/807
[58] Field of Search ......................... 426/69, 636, 807; 162/66, 89

[56] References Cited

U.S. PATENT DOCUMENTS

| | | | |
|---|---|---|---|
| 1,424,620 | 8/1922 | Cataldi | 162/66 X |
| 2,293,845 | 8/1942 | Millar | 426/69 |
| 2,724,648 | 11/1955 | Burdick | 426/69 |
| 3,682,644 | 8/1972 | Nagakura | 426/69 X |
| 3,810,649 | 12/1974 | Bonnell | 426/69 |
| 3,873,728 | 3/1975 | Moore | 426/807 X |
| 3,873,733 | 3/1975 | Moore | 426/807 X |
| 3,873,734 | 3/1975 | Higgins et al. | 426/807 X |
| 3,878,304 | 4/1975 | Moore | 426/807 X |
| 4,048,341 | 9/1977 | Lagerstrom | 426/636 X |
| 4,082,859 | 4/1978 | Katzen | 426/636 |
| 4,118,271 | 10/1978 | Oku et al. | 162/89 X |

OTHER PUBLICATIONS

Morrison "Feeds & Feeding", Morrison Publishing Co., 1957, pp. 347–348, 379–382 & 397–398.
Johanning, M. S. Thesis, University of Missouri, Columbia, 1976.
Rydholm "Pulping Processes", Interscience Publishers (1970), pp. 918–921, 944–947 & 950–955.

*Primary Examiner*—R. B. Penland
*Attorney, Agent, or Firm*—Senniger, Powers, Leavitt and Roedel

[57] ABSTRACT

Improved ruminant animal feedstuffs of substantially increased crude protein content are prepared by first subjecting a feedstuff of relatively low crude protein content to chlorination and then subjecting the chlorinated feedstuff to ammoniation.

8 Claims, No Drawings

ANIMAL FEEDSTUFFS AND PROCESS

BACKGROUND OF THE INVENTION

This invention relates generally to the field of animal nutrition and more particularly to feedstuffs of substantially increased crude protein content for ruminant animals. Still more specifically, the invention relates to improving the ruminant nutritional value of poor quality plant materials having a relatively low crude protein content.

As is known, the ruminant animal has the ability to convert poor quality roughages and nonprotein nitrogen into high quality protein. This conversion is accomplished by bacteria present in the rumen. The ruminant is not highly efficient, however, in transforming forages into ruminant products such as meat and milk. One major factor that limits this efficiency is the level of nitrogen in the diet. Forages containing a low level of crude protein are not as valuable for the ruminant as are forages containing higher levels. For this reason, urea and other nonprotein nitrogen compounds have been used to boost the crude protein content of roughages containing low levels of nitrogen. One problem that frequently accompanies the feeding of high levels of nonprotein nitrogen compounds is the rapid hydrolysis of these compounds to $NH_3$ by rumen bacterial enzymes. Urea, for example, is hydrolyzed by the enzyme urease into $NH_3$ and $CO_2$ in the rumen. Ammonia nitrogen is converted by rumen bacteria into amino acid nitrogen and then into bacterial protein. Ammonia present in excess of the level that bacteria can effectively use for protein synthesis is of little value to the ruminant, and the excess $NH_3$ can cross the rumen wall, enter the blood stream and lead to $NH_3$ toxicity. For this reason, it is desirable to retard the rate of hydrolysis of nonprotein nitrogen, so that excess and potentially toxic levels of $NH_3$ are not produced in the rumen.

Numerous studies have been conducted in which crop residues or agricultural products were treated with $NH_3$ for the purpose of increasing the crude protein content and/or digestibility of the roughage. In the rumen, the $NH_3$ contained in nonprotein nitrogen compounds can be used by microbes for protein synthesis just as $NH_3$ produced from urea or protein degradation can be used for this function.

Millar (Ind. Eng. Chem., 33:274, 1941) obtained a product containing four percent nitrogen when dry sugar beet pulp was ammoniated. McCall and Graham (J. Anim. Sci., 11:270, 1952) found that steers fed ammoniated furfural made higher daily gains than those fed urea as a protein supplement. Magruder et al. (J. Agr. Food Chem., 1:944, 1953) fed ammoniated hemicellulose extract to dairy heifers and found that animals used the nitrogen of this ration as well as they used the nitrogen of control rations containing soybean meal. Ammoniated molasses has been studied extensively as a crude protein source for ruminants. Wiggins (Sugar J., 18:18, 1956) found that imidazole and pyrazine derivatives in ammoniated molasses were responsible for the toxicity observed when this product was fed to animals. He also found that acidification of the product would prevent toxicity. Temple and Wiggins (Intern. Sugar J., 58:9, 1956) determined that as much as two percent nitrogen was absorbed by bagasse when anhydrous $NH_3$ was added to it. The authors suggested that $NH_3$ reacted with lignin and sugars in the bagasse. Reaction of $NH_3$ with the sugars produced pyrazine and imidazole compounds, but the product was nontoxic for cattle.

Rice hulls and straw have been the poor quality plant materials most often used in ammoniation studies, probably because these materials are very low in crude protein. Eng (Feedstuffs, 36:44, 1964) found that ammoniated rice hulls improved the digestibility of low energy diets, but Furr and Carpenter (J. Anim. Sci., 26:919, 1967) showed that nitrogen digestibility of high energy diets was not improved when ammoniated rice hulls were fed at levels less than 10 percent of the total diet. Eng and Riewe (J. Anim. Sci., 22:736, 1963) have shown that ammoniated rice hulls are less toxic than urea to sheep. Waiss et al. (J. Anim. Sci., 35:109, 1972) treated several straws with aqueous $NH_3$ for 30 days at ambient temperatures. They increased the enzymatic digestibility of the straws by 10 percent, and increased the nitrogen content by 133 percent. In another report, Garrett et al. (Proc. Western Section, Am. Soc. Anim. Sci., 25:317, 1974) determined that inclusion of ammoniated rice straw in lamb diets resulted in improved feed consumption and increased digestibility of dietary cellulose. In a review article by Hart et al. (Feedstuffs, 47:22, 1975), methods used to ammoniate rice straw, and to treat this material with alkali, have been described. These authors concluded that a process of low moisture alkali treatment of straw, followed by compaction, gives good digestibilities and has a number of advantages over other treatment processes.

In earlier work, Johanning (M. S. Thesis, University of Missouri, Columbia, 1976) treated corn stover with sodium hypochlorite, followed by aqueous $NH_3$ in an effort to increase both the digestibility and crude protein level of the stover. This hypochlorite treatment oxidized the stover and increased its reactivity with $NH_3$. Corn stover treated with hypochlorite plus aqueous $NH_3$ contained approximately 20 percent crude protein, whereas stover treated with $NH_3$ alone, without previous hypochlorite treatment, contained only about eight percent crude protein. Oxidation and ammoniation also improved in vitro dry matter digestibility of the corn stover in some instances.

The literature thus reveals that much effort has been directed toward increasing the efficiency of use of poor quality roughages and nonprotein nitrogen by ruminants. A limited success has been achieved by treating such feedstuffs with ammonia. A continuing need exists, therefore, for improving the crude protein level of poor quality plant materials through chemical treatment.

SUMMARY OF THE INVENTION

Among the objects of the present invention may be mentioned an improved process for increasing the crude protein content of ruminant animal feedstuffs of relatively low crude protein content; the provision of a process of the type described which is practical and economical to carry out and which produces a significant increase in the crude protein content of ruminant animal feedstuffs; the provision of such a process which is applicable to various types of poor quality plant materials of low crude protein content; and the provision of improved ruminant animal feedstuffs prepared by the process of the invention. Other objects will be in part apparent and in part pointed out hereinafter.

Briefly, the invention is directed to the process of increasing the crude protein content of a ruminant animal feedstuff of relatively low crude protein content comprising the steps of first subjecting the animal feedstuff to chlorination and then subjecting the chlorinated feedstuff to ammoniation. The invention is also directed to the novel ruminant animal feedstuff of substantially increased crude protein content resulting from the process.

DESCRIPTION OF THE PREFERRED EMBODIMENTS

In accordance with the invention, it has now been found that the crude protein content of a ruminant animal feedstuff of relatively low crude protein content can surprisingly be substantially increased by first subjecting the feedstuff of low crude protein content to chlorination and then subjecting the chlorinated feedstuff to ammoniation. As shown by the experimental test results set forth hereinafter, the percent crude protein of untreated corn stover, chlorinated stover, ammoniated stover and chlorinated-ammoniated stover were $4.41 \pm 0.03$, $5.06 \pm 0.06$, $12.59 \pm 0.43$ and $39.47 \pm 0.06$, respectively, and the percent crude protein of untreated wheat straw, chlorinated straw, ammoniated straw and chlorinated-ammoniated straw were $3.77 \pm 0.21$, $4.01 \pm 0.13$, $6.44 \pm 0.18$ and $42.32 \pm 0.46$, respectively. By contrast, treatment of corn stover with aqueous hypochlorite followed by ammoniation produced a crude protein content of only $14.51 \pm 0.29$. Thus, the present invention achieves surprisingly high increases in the crude protein content of low quality plant materials or feedstuffs and hence significantly improves the nutritional value of such materials. While the precise mechanism for obtaining these significant increases in crude protein content is not fully understood, it will be seen that treatment with chlorine gas substantially increases the concentration of carbonyl groups in the treated material and it is believed that the subsequent reaction of ammonia with these carbonyl groups is at least partially responsible for the large increase in the crude protein content observed for the chlorinated-ammoniated material. The digestibility of the feedstuff material is not significantly affected by the chemical treatment of the invention.

Further, experimental data set forth hereinafter indicate that less $NH_3$ was released into incubation mixtures containing chlorinated, ammoniated corn stover or wheat straw than into stover-$NH_4HCO_3$ incubation mixtures at all times during the incubation period which in turn indicates that chlorinated, ammoniated corn stover or wheat straw would be less likely to cause $NH_3$ toxicity problems in ruminants than would an isonitrogenous amount of corn stover and an easily hydrolyzed nonprotein nitrogen source such as $NH_4HCO_3$.

Another experimental study set forth hereinafter indicates that chlorinated, ammoniated corn stover released $NH_3$ more steadily into rumen fluid than did urea, this steady release of $NH_3$ from nonprotein nitrogen being desirable because it allows $NH_3$ to remain in the rumen at constant, intermediate levels for long periods.

The chlorination and ammoniation steps of the novel process of the invention may be carried out in any convenient manner. For example, the ruminant animal feedstuff of relatively low crude protein content may be mixed with water to approximately 25–35% dry matter and the mixture placed in a column or plastic bag and subjected first to chlorination and then to ammoniation as described hereinafter. It has been observed that the chlorinated, ammoniated feedstuff has a much darker color than the chlorinated material. The chlorination and ammoniation treatments should be carried out with the feedstuff in the presence of water. After the chlorination and ammoniation treatments, the treated feedstuff is normally dried prior to use but it can be used in the wet state, as by being mixed with conventional dry ruminant animal feedstuffs.

Forages of relatively low crude protein content such as corn plants and other green growing crops being harvested in the high moisture stage for silage may be chlorinated and ammoniated in accordance with the invention without adding or removing water. The treated forages may then be left stored in a silo or large plastic bag until feeding time. It will be understood that the chlorination and ammoniation treatments may be carried out in large steel glass-lined silos found on many farms or in large plastic bags used for feedstuff preservation and storage on farms.

The present invention is useful for increasing the crude protein content of various agricultural residues, animal roughages or animal feedstuffs of relatively low crude protein content including, for example, corn stover, wheat straw, peanut hulls, bran, alfalfa, corn cobs, sawdust, wood shavings, wood bark and bagasse. Other materials of this type known to the art may also be treated in accordance with the process of the invention.

The novel ruminant animal feedstuff of the present invention may be conveniently incorporated with conventional animal feed ration components and constitute up to 10 percent or more of a ruminant animal's diet.

The following illustrates the practice of the invention.

A. MATERIALS

1. Reagents and Apparatus

All chemicals used were reagent grade, except as noted. Ammonia, chlorine and carbon dioxide gases were obtained from commercial cylinders. The apparatus used for each type of experiment is described below.

B. METHODS

1. Corn Stover and Straw Preparation

Samples of Hybrid Cargill 920 corn plants were obtained at the end of October, at the time the corn was being harvested. The corn grain and cob were removed from the whole plant, and the material remaining was referred to as corn stover. The stover or whole plant was dried at 50° C. in a forced air oven for 24 hours, and was ground to a smaller size in a Viking hammermill. The stover or whole plant was then ground in a Wiley mill to pass through a one millimeter screen. The ground sample was stored in a plastic garbage bag tied with a string.

2. Hypochlorite Treatment of Corn Stover

Corn stover or whole corn plant was oxidized with sodium hypochlorite as follows. Three liters of 5.25 percent (weight/volume) sodium hypochlorite ("Clorox" bleach) was added to a 17 liter "Pyrex" cylindrical jar. Two liters of water were added and the mixture was stirred with a magnetic stirrer for five minutes. All water used was either distilled or in most cases distilled and deionized. A pH electrode was placed in the jar and concentrated HCl (12 N) was added slowly (about 40 ml per minute) until the pH reached 6.0. The initial pH was about 11 before HCl was added to the mixture. Gases that probably include $Cl_2$ gas were evolved from the mixture during HCl addition, so the treatment was done in a hood.

Corn stover or whole corn plant (320 g of dry matter) was added to the mixture at pH 6.0, and the mixture was stirred with a large spatula until all the plant material was exposed to the hypochlorite solution. The pH was maintained at five to six by periodically adding 40 percent (weight/volume) NaOH. The mixture was stirred with a spatula before the plant material settled to the bottom of the jar, and then it was stirred with a magnetic stirrer. The spatula and pH electrode were washed with water after use, to rinse adhering plant material back into the jar. The sides of the jar were rinsed with water, and the mixture was stirred for one hour from the time of addition of corn plant.

After one hour, 1.0 liter of ethanol was added, and the mixture was stirred with a spatula until well mixed. The mixture was then filtered on a 325 millimeter inner diameter table style porcelain Coors Buchner funnel. It was filtered through eight layers of cheesecloth and the jar was rinsed with water. The filtered material was washed with one to two liters of ethanol and spread out to air-dry. The material was crumbled into small pieces before air drying. The dry matter was washed five times with one to two liters of water, filtered with cheesecloth after each washing, and then was dried at 50° C. for 24 hours in a forced air oven. The hypochlrite-treated corn plant was stored in a large plastic bag.

3. Ammonia Treatment of Hypochlorite Oxidized Corn Plant

Corn stover or whole corn plant that was oxidized with hypochlorite was treated with aqueous $NH_3$ by adding 20 g of the plant material to 400 ml of a solution containing 300 ml of concentrated $NH_4OH$ (15 N) and 670 ml of water. This solution contained 78.4 g of $NH_3$ per liter of solution. The mixture of plant and aqueous $NH_3$ was stirred for one hour in a hood, and was then air-dried in a large "Pyrex" dish for three days.

4. Treatment of Corn Stover with Chlorine and Ammonia Gas

Two methods were used for this treatment. The first method employed a glass column with a 2.5 centimeter inner diameter and a length of approximately 50 centimeters. The column contained a fritted glass bottom covered with a plug of glass wool.

The corn stover (10 g) was mixed with water to approximately 35 percent dry matter, and was placed in the column. A tube attached to a cylinder containing chlorine gas (Matheson Gas Products; 99.5 percent pure) was connected to the bottom of the glass column, and $Cl_2$ was allowed to filter upward through the column for about 20 seconds. All gas additions took place in a hood. In a similar manner, $NH_3$ gas (Matheson Gas Products; 99.99 percent pure) was allowed to filter through the column for 20 seconds. The stover was removed from the column and the chlorinated material was separated from the material treated with both chlorine and $NH_3$. This separation was based on color differences between the two products. The chlorinated, ammoniated stover had a much darker color than the chlorinated stover. After air-drying overnight, the treated stovers were analyzed for nitrogen by the micro-Kjeldahl method (Association of Official Agricultural Chemists, 1965). A sample of chlorinated, ammoniated stover was further air-dried for three to five days, then dried in a vacuum oven at 50° C. for 16 hours and analyzed for nitrogen.

The second treatment method involved spreading the stover out over a large flat area and adding water to approximately 25 percent dry matter. The stover (20 g.) was placed in a clear plastic bag (eight inches by fifteen inches, 1.5 mil thickness), and $Cl_2$ gas was blown into the bag until the bag was puffed up like a balloon. The bag was then closed, tied and left in the position for five to ten minutes. After this time, the bag was refilled with $Cl_2$ gas, tied again and held for another five to ten minutes. The bag was occasionally shaken to mix the contents with the gas during both gassing periods. The $Cl_2$ was evacuated from the bag by opening it for three to five minutes. A portion of the chlorinated stover was removed to dry, and the remainder was subjected to $NH_3$ treatment. A control bag containing untreated corn stover (25 percent dry matter) was also subjected to $NH_3$ treatment at the same time.

This treatment consisted of blowing $NH_3$ gas into the bag until the bag puffed up, tieing the bag, and leaving the stover in the bag for one to two hours, with occasional shaking. The treated stover was removed from the bag and air-dried. These treated stovers were stored in glass jars with screw top lids.

The following method was used for preparing larger amounts of chlorinated, ammoniated stover for Guinea pig feeding trials. Untreated stover (1338 g) was placed in a large plastic garbage bag. The stover was mixed by hand in the bag with water to a dry matter level of approximately 20 percent. Chlorine gas was added to the bag until it puffed up. The gas inlet tube was then removed and the bag tied. The contents of the bag were mixed by shaking the bag from the outside. The $Cl_2$ addition and mixing were repeated three times. The bag was then opened and excess $Cl_2$ gas was allowed to escape from the bag for 15 minutes.

After this time period, the chlorinated stover in the plastic bag was sprayed with a stream of gaseous $NH_3$. The $NH_3$ gas did not permeate the considerably larger amount of plant material as well as the $Cl_2$ gas did, so it was necessary to sift the chlorinated stover with one gloved hand, while simultaneously spraying with $NH_3$ gas with the other. The stover was sprayed until it had all changed from the bright orange color of chlorinated stover to the dark brown color of chlorinated, ammoniated stover. The treated plant material was allowed to air-dry while in the plastic bag, and then was stored in the plastic bag.

To prepare even larger amounts of chlorinated, ammoniated stover for sheep toxicity studied, the following procedure was used. Corn stover from Hybrid Cargill 920 corn was obtained either shortly after harvest, or in the spring following harvest of the corn grain. The stover was ground, without drying, through a Viking hammermill, using a 0.64 centimeter (one-quarter inch) sieve. Some of the stover did not grind very well, and as a result it had a stringy appearance after grinding. All of the stover was mixed well by hand after grinding, so that differences in stover composition that might result from variations in the times that the stover was collected would be minimized.

The corn stover was treated by placing approximately five kg in a large plastic bag, adding water to a moisture level of approximately 20 percent and mixing the stover well by hand. The wet stover was then placed on a plastic sheet in a hood, and was sprayed with $Cl_2$ gas until all the stover had turned from a brown color to the characteristic orange to tan color of chlorinated stover. The chlorinated stover was allowed to remain in the hood overnight, and was then sprayed with $NH_3$ gas. Neither the $Cl_2$ nor the $NH_3$ gases penetrated the stover very well, so the stover had to be sifted frequently to expose all of it to the two gases. The chlorinated, ammoniated stover was then allowed to air-dry by spreading it out on a large plastic sheet in a well ventilated room. About 30 kg of treated stover were prepared in five lots by repeating the procedure. The treated stover was analyzed for dry matter and nitrogen, and was stored in large plastic bags.

5. Treatment of Straw with Chlorine and Ammonia Gases

Wheat straw cut into 15 centimeter pieces was washed and drained three times with cold water. One aliquot of the washed straw was set aside to dry, and another aliquot was used for dry matter determination. The remainder of the wet straw was divided into two groups (about 20 g per group), and each group was placed in an eight inch by fifteen inch, 1.5 mil plastic bag. Chlorine gas was admitted to one of the bags containing wet straw, until the bag puffed up. The gas inlet was then removed and the bag was tied closed for five minutes. Chlorine addition was repeated and the bag was tied closed for 2.5 hours. During both chlorination periods, the bags were occasionally shaken to expose all of the straw to the gas. After chlorination, about half of the straw exposed to $Cl_2$ was removed and air-dried.

The remainder of the chlorinated straw in the plastic bag was exposed to $NH_3$ (using the same procedure outlined earlier) for five minutes. The bag was opened, the contents were again exposed to $NH_3$ gas and the bag was tied closed tightly for two hours. The bag was again shaken periodically during gaseous $NH_3$ treatment to insure that all the straw was exposed to $NH_3$. The ammoniation procedure was repeated for the remaining untreated wet straw.

After treatment, the plant material was removed from the plastic bags, spread and air-dried overnight. It was then ground to pass through a one millimeter screen and stored in glass bottles with screw top lids.

6. Collection of Rumen Fluid

Rumen fluid was collected from a 300 to 320 kg fistulated cow consuming an all roughage diet. All samples were obtained through permanent ruminal cannulae and were collected in 4 liter containers previously warmed to 37° C. and equilibrated with $CO_2$. The rumen fluid was filtered through four layers of cheesecloth before use.

7. Kjeldahl Analysis for Nitrogen

Samples were analyzed for nitrogen using the macro- or the micro-Kjeldahl procedure of the Association of Official Agricultural Chemists, 1965. For the micro-Kjeldahl procedure, 30 mg samples were weighted into a 30 ml digestion flask, and 2.0 g of "Kelpac" (containing 1.9 g of $K_2SO_4$ and 0.13 g of HgO) were added along with 2.2 ml of concentrated $H_2SO_4$ (36 N). After adding a glass bead, the samples were digested on a "Labconco" digestion rack until they became clear, and then for an additional 30 minutes. The samples were cooled, and water was added to dissolve any solids in the flask.

The digested material was transferred to a Fisher distillation apparatus with five to six rinses of water. A 125 ml Erlenmeyer flask containing 5.0 ml of 4.0 percent (weight/volume) boric acid and one drop of mixed indicator was placed so that the condenser tip of the distillation apparatus was beneath the surface of the boric acid. The mixed indicator contained one part of 0.2 percent (weight/volume) alcoholic methyl red solution and five parts of 0.2 percent (weight/volume) alcoholic bromocresol green solution. After adding eight to ten ml of $NaOH-Na_2S_2O_3$ solution to the digestate already in the distillation apparatus, the $NH_3$ formed was collected in the boric acid solution after steam distillation. The collected $NH_3$ was titrated with standardized 0.01 N HCl to a mixed indicator (gray) endpoint. The $NaOH-Na_2S_2O_3$ solution was made by dissolving 60.0 g of NaOH and 5.0 g of $Na_2S_2O_3$ in water and diluting to 100 ml.

The macro-Kjeldahl procedure was similar to the micro-Kjeldahl procedure, with the exceptions that larger sample sizes were used for the macro-Kjeldahl, and $CuSO_4$ was used as the catalyst in place of HgO. The $CuSO_4$ catalyst was used because large amounts of HgO would present disposal problems. A 0.5 to 1.0 g sample was accurately weighed into a 500 ml Kjeldahl flask, and 10.0 g of $K_2SO_4$, followed by 0.6 g of $CuSO_4.5H_2O$ were added to each flask. Concentrated $H_2SO_4$ (25 ml) and three glass beads were added to each flask. The samples were digested on a "Labconco" digestion rack for 45 to 60 minutes after the samples turned clear. The samples were cooled and diluted to approximately 200 ml with water.

The digested material was distilled into 50 ml of four percent (weight/volume) boric acid, after layering 90 to 100 ml. of the $NaOH-Na_2S_2O_3$ mixture described earlier. The collected $NH_3$ was titrated with standardized 0.1 N NCl to a gray endpoint.

8. Determination of Free Ammonia

Free $NH_3$ in treated plant materials and in incubation mixtures was determined by two methods. One involved steam distillation with MgO (Association of Official Agricultural Chemists, 1965) and the other was the alkaline phenate method (Chaney and Marbach, 1962, Clin. Chem. 8:130). When the steam distillation method was used, a one g sample of plant material (accurately weighed) was placed in a 500 ml Kjeldahl flask, followed by two glass beads, several drops of mineral oil, 1.0 ml of 25 percent (weight/volume) $CaCl_2.2H_2O$ and 200 ml of water. Then 3.5 g of solid MgO were added with a scoop, and the mouth the Kjeldahl flask was quickly connected to a stopper attached to a macro-Kjeldahl distillation apparatus. Fifty ml of 4.0 percent (weight/volume) boric acid and two drops of mixed indicator were added to a receiving flask, and 100 ml of liquid from the Kjeldahl flask were distilled into the boric acid in the receiving flask. The $NH_3$ trapped by the boric acid as ammonium borate after distillation was titrated to a gray endpoint with standardized 0.05 N HCl.

The procedure for the alkaline phenate determination of $NH_3$ was as follows. A stock $(NH_4)_2SO_4$ solution was prepared by dissolving 58.302 mg in water and diluting to exactly one liter in a volumetric flask. This solution contains 15.0 micrograms of $NH_3$ per ml of solution. A standard curve containing from 0 to 9.0 micrograms of $NH_3$ per test tube was prepared by adding appropriate volumes of the standard solution to a series of tubes, and adding water to each tube to 1.00 ml total volume. The first color reagent, Solution I, was added to each tube (1.0 ml), quickly followed by the addition of 1.0 ml of Solution II, the second color reagent. The composition of Solution I and Solution II is given in Table I. Sodium nitroprusside was used as a catalyst to speed up color development. The tube contents were quickly mixed and allowed to sit at room temperature for 30 minutes or longer. After adding 10.0 ml of water, the tube contents were mixed and the absorbance was read at 630 nm using a Beckman model DB-G grating spectrophotometer. Free $NH_3$ in rumen fluid incubation mixtures was determined by diluting an aliquot of the incubation mixture until an absorbance reading was obtained that fell on the linear portion of the standard curve. This absorbance reading was then converted to mg percent $NH_3$ in the original incubation mixture.

TABLE I

COMPOSITION OF AMMONIA COLOR REAGENTS

| Component | Concentration |
|---|---|
| Solution I | |
| Liquefied Phenol | 52.1 ml per liter |
| Sodium Nitroprusside | 59.6 ml per liter |
| Solution II | |
| Sodium Hydroxide | 25.0 g per liter |
| Sodium Hypochlorite (4–6%) | 42.0 ml per liter |

9. Determination of Blood Ammonia in Guinea Pigs

Guinea pig blood $NH_3$ was determined by the method of Rash (1967), using a microdiffusion procedure similar to that described by Bassman (1959). A microdiffusion procedure on whole blood was necessary, because Guinea pig plasma was found to contain very low levels of $NH_3$. Blood samples were taken from Guinea pigs by cardiac puncture. The syringe used to obtain samples was rinsed with 10.0 percent (weight/volume) potassium oxalate just prior to taking the sample. The blood samples (six to ten ml) were transferred to oxalate-coated test tubes as quickly as possible after sampling. The tubes were prepared by adding 0.1 ml of 10.0 percent (weight/volume) potassium oxalate to the tube, rotating the tube while tilted to produce maximal spreading, and placing the tube in a 100° C. oven to dry. After adding blood to the tube it was rotated gently but thoroughly to dissolve and distribute the oxalate anticoagulant.

Reagents consisted of dilute $H_2SO_4$, standard nitrogen solutions and Nessler's reagent. The $H_2SO_4$ was prepared by diluting 2.76 ml of concentrated $H_2SO_4$ to exactly one liter in a volumetric flask. This was a 0.1 N solution. A 1.0 N solution was prepared by diluting 27.6 ml of concentrated $H_2SO_4$ to exactly one liter with water. A stock nitrogen solution was prepared by dissolving 707.9 mg of $(NH_4)_2SO_4$ in 0.1 N $H_2SO_4$ and diluting to 100 ml in a volumetric flask with 0.1 N $H_2SO_4$. This solution contained 1500 micrograms of nitrogen per ml of solution. This stock solution was diluted as needed with 0.1 N $H_2SO_4$ to give a working standard containing 50.0 micrograms of nitrogen per ml of solution.

Nessler's reagent was prepared by dissolving 45.5 g of $HgI_2$ and 34.0 g of KI in 150 ml of water. A solution of 112.0 g of KOH in water was mixed with the above solution and the volume was adjusted with water to give one liter of reagent. A saturated $K_2CO_3$ solution was also prepared.

A standard curve was prepared using aliquots of from 0 to 0.40 ml of the standard working solution (50.0 micrograms of nitrogen per ml of solution). These volumes were added to diffusion bottles, and water was added to give a total volume of 1.00 ml per bottle. Then 0.5 ml of saturated $K_2CO_3$ were added, and a glass paddle with a ground glass tip soaked in 1.0 N $H_2SO_4$ was inserted. The addition of $K_2CO_3$ increased the pH to facilitate the release of $NH_3$. After the vessels were sealed, they were rotated mechanically on a special wheel for 30 minutes. Following diffusion of the $NH_3$ into the $H_2SO_4$, the nitrogen on each paddle was mixed in a test tube with a solution containing 0.25 ml of Nessler's reagent in 3.0 ml of water. The absorbance of the samples was read at 450 nm in a Beckman Model DB-G grating spectrophotometer.

Oxalated blood (1.00 ml) obtained from the Guinea pigs was placed in a diffusion bottle and analyzed for $NH_3$ in a manner similar to that used for the standards. Blood $NH_3$ values were expressed as mg of $NH_3$ per 100 ml of blood. Blood samples from each animal were analyzed in duplicate.

10. Determination of Ammonia and Urea in the Blood Plasma and Rumen Fluid of Sheep Ammonia and urea in the blood plasma and rumen fluid of sheep were determined by the previously described method of Chaney and Marbach (1962). Sheep blood plasma was obtained via intravenous catheter, using a "Quick-Cath" needle with an intravenous catheter and obturator unit (Vicra Sterile, Incorporated). Blood sampling procedures will be described in detail in a later section. Frozen blood plasma was thawed and mixed well. A 0.2 ml aliquot of the plasma was diluted to 1.0 ml with water, and $NH_3$ analysis of the blood plasma was conducted using the method of Chaney and Marbach (1962). Another aliquot of the blood was diluted one to ten with water, and a 0.2 ml aliquot of the diluted blood was incubated with a urease solution (Sigma Chemical Company) in a total volume of 1.0 ml. After incubating for 15 minutes, the $NH_3$ content of the solution was determined by the Chaney and Marbach (1962) method. Blood plasma $NH_3$ concentrations were subtracted from $NH_3$ concentrations found in blood plasma incubated with urease, to obtain the concentration of urea in the blood plasma samples.

Centrifuged frozen rumen fluid was thawed and mixed well. The solid material in the rumen fluid was allowed to settle for about 20 minutes, and the fluid was diluted 1 to 100 with water. A 1.0 ml sample of diluted rumen fluid was then analyzed for $NH_3$ by the method of Chaney and Marbach (1962) as described earlier.

11. Determination of In Vitro Dry Matter Digestibility of Treated Stover and Straw The following method was used to determine the in vitro dry matter digestibility of treated straw and stover samples.

Fifty ml polypropylene centrifuge tubes fitted with rubber stoppers were used as incubation vessels. Samples were run in triplicate, and triplicate blanks containing all components except treated stover or straw were incubated along with the plant samples. In addition, triplicate samples of "Solka Floc" (wood cellulose) were incubated with the plant samples.

The corn stover or straw (250 mg samples) were accurately weighed and placed in the centrifuge tubes. Twenty ml of McDougall's (1948) buffer solution (see Table II for description of components) and one ml of a solution containing 20.0 mg of urea nitrogen per ml of solution were added to each tube. These tubes were then capped with rubber stoppers and placed in a 38° C. water bath while rumen fluid was collected.

TABLE II

| COMPOSITION OF McDOUGALL'S BUFFER SOLUTION | |
|---|---|
| Component | Grams per Liter of Solution |
| $NaHCO_3$ | 9.80 |
| KCl | 0.57 |
| $Na_2HPO_4$ | 4.93 |
| NaCl | 0.47 |
| $MgSO_4 \cdot 7H_2O$ | 0.12 |
| $CaCl_2 \cdot H_2O$ | 0.053 |

After collection, the rumen fluid was strained through four layers of cheesecloth and $CO_2$ was bubbled through the fluid for five minutes. After mixing well, 5.0 ml of rumen fluid were then added to each of the tubes in a water bath with an Oxford pipettor. Each tube was then individually gassed with $CO_2$, and a rubber stopper was inserted into the mouth of the tube as the $CO_2$ source was removed. The tubes were gassed for ten to twenty seconds each. The rubber stoppers were kept in place in the tubes by taping them down with reinforced tape at about two or three hours after the start of incubation. Pressure partially forced the stoppers out of some of the tubes, and the stoppers were tightly reinserted without apparent ill effect. The digestibilities obtained with these plant samples using rubber stoppers were higher than those obtained using Bunsen values. The tubes were shaken periodically by hand several times a day to suspend the plant material in the incubation medium.

After incubating 48 hours, the microbial activity was stopped by adding 1.0 ml of 5.0 percent (weight/volume) $HgCl_2$. To improve the sedimentation of the dry matter, 2.0 ml of 0.1 N $Na_2CO_3$ were added to each tube. The tubes were centrifuged at $1800 \times g$ for 15 minutes, and the supernatant was carefully removed by siphoning with a suction flask.

A pepsin solution was prepared by adding 8.0 g of Fisher purified pepsin to 850 ml of water. The pepsin was dissolved by gently swirling and 100 ml of 1.0 N HCl were added. The solution was mixed by gently swirling, and was made to one liter total volume in a volumetric flask. Thirty ml of this solution were added to each tube, and the tube contents were mixed by stirring with a spatula. The tubes were stoppered with Bunsen valves and incubated at 38° C. in a water bath for 48 hours.

After this time period, the tubes were removed and centrifuged at $1800 \times g$ for 15 minutes. After siphoning off the supernatant, 30.0 ml of water were added, the contents were mixed and the tubes were again centrifuged at $1800 \times g$ for 15 minutes. The supernatant was siphoned off and the residue was transferred to a previously tared 50 ml glass beaker. The tubes were washed with 25.0 ml of water, and residue remaining on the sides of the tubes was removed by scraping with a spatula. The beakers were dried at 100° C. for two to three days and were then reweighed. Drying and reweighing were repeated until the beaker weights were constant.

The weight of a single residue minus the average of the three blanks was divided by the dry weight of the original plant sample added, then multiplied by 100 to give the weight in g of indigestible dry matter in 100 g of the plant sample. This number subtracted from 100 gives the percent of dry matter digested. This method is based on the premise that anaerobic bacteria in the buffered rumen fluid will degrade plant carbohydrates during the first 48 hour incubation. Pepsin at low pH will then hydrolyze bacterial and plant protein during the second 48 hour period, leaving only indigestible plant dry matter after washing the residue.

12. Isolation of Bacteria from Rumen Fluid Incubation Mixtures

Bacterial cell density and bacterial nitrogen content were used as criteria to assess the extent of bacterial protein synthesis by rumen bacteria incubated with various carbohydrate and nitrogen sources. Bacterial cell mass was estimated by measuring the amount of light scattered by a suspension of bacteria with a spectrophotometer. Bacterial nitrogen was measured by the Association of Official Agricultural Chemist's micro-Kjeldahl method (1965).

Isolation of bacteria from rumen fluid incubation mixtures was accomplished by adding 0.3 g of plant dry matter to a 50 ml polypropylene centrifuge tube, followed by 40.6 mg of urea, 20.0 ml of McDougall's buffer solution (1948), 0.5 ml of a solution containing 0.6 g of glucose per ml of solution and 5.0 ml of rumen fluid. The contents of the tube were mixed with a spatula and were then squeezed through four layers of cheesecloth into another polypropylene centrifuge tube. This straining process removed the bulk of the plant material, which sometimes did not sediment very well upon low speed centrifugation.

The strained material was then centrifuged at $114 \times g$ for ten minutes to remove protozoa and feed particles. The supernatant was removed with a Pasteur pipet, placed in another 50 ml centrifuge tube and centrifuged at $19,000 \times g$ for 20 minutes to sediment the bacteria. The supernatant was discarded and the remaining pellet was suspended in 15.0 ml of the buffer described in Table III. A "Teflon" pestle was used to suspend the bacteria in the wash buffer. The suspension was centrifuged at $19,000 \times g$ for 20 minutes, and the washing and centrifugation were repeated. The pellet was finally suspended in 15.0 ml of water. The presence of bacteria in this suspension was confirmed by microscopic examination. The absorbance at 650 nm of this suspension, and of one to five and one to ten dilutions of this suspension, was measured on a Beckman model DB-G grating spectrophotometer, using a water blank.

TABLE III

| COMPOSITON OF BACTERIAL WASHING BUFFER | |
|---|---|
| Component | Grams per Liter of Solution |
| NaCl | 5.00 |
| $CH_3COONa$ | 2.15 |
| $KH_2PO_4$ | 0.35 |
| $K_2HPO_4$ | 1.00 |
| $MgSO_4 \cdot 7H_2O$ | 0.12 |

13. Determination of Bacterial Protein Synthesis with Corn Stover Substrate

The amount of protein synthesized by rumen bacteria after incubation of rumen fluid with various corn stover fractions was determined by two methods. The first method involved estimation of cell mass by measuring the light scattered by a suspension of bacteria, and the second involved determining the nitrogen content of an aliquot or bacteria from the incubation mixture.

The bacterial protein synthesis was determined first under conditions in which the amount of carbohydrate present in the incubation tube would not limit the amount of protein synthesized. Extra carbohydrate in the form of glucose was added to these tubes. The incubations were conducted by adding untreated corn stover, chlorinated corn stover, ammoniated corn stover or chlorinated, ammoniated corn stover (0.3000 g of dry matter of each) in duplicate to 50 ml polypropylene centrifuge tubes. After adding 20.0 ml of McDougall's buffer solution (1948) (see Table II), 0.5 ml of a solution containing 0.6 of glucose per ml were added to each tube. Urea solution (40.6 mg per ml) was then added to each tube in a volume sufficient to give 0.0189 g of nitrogen in each tube. Water was added so that the total volume of water plus urea solution added to each tube was 1.0 ml. Five ml of rumen fluid were added to each tube. Carbon dioxide was bubbled through the rumen fluid for five minutes before it was added to the tubes.

Each tube was then individually gassed with $CO_2$ and capped with a rubber stopper as the tube carrying $CO_2$ was removed. The tubes were incubated with occasional stirring for 48 hours in a 38° C. water bath. After two or three hours, the rubber stoppers were taped lightly to the tubes with reinforced tape. Tubes identical to those described above were prepared in duplicate, but were not incubated. The amount of bacterial protein already present in these zero time tubes was determined as described below, and was subtracted from the amount determined for the 48 hour incubated tubes. This value is the net amount of bacterial protein synthesized over the 48 hour period by rumen microorganisms using the various sources of energy and nitrogen listed above.

From this point on, the zero time tubes and the tubes incubated for 48 hours were treated identically. The contents of each tube were stirred well with a spatula and were squeezed through four layers of cheesecloth into another similar tube. This process removed large feed particles that did not sediment well upon low speed centrifugation. The tubes were centrifuged at 114×g for ten minutes to sediment protozoa and feed particles. A 15.0 ml aliquot of the supernatant was transferred to another centrifuge tube, and the tube was centrifuged at 19,000×g for 20 minutes to sediment the bacteria. The pellet was resuspended in 15.0 ml of the wash buffer described in Table III and centrifuged at 19,000×g for 20 minutes. The washing process was repeated, and the pellet was finally suspended in 15.0 ml of water. After diluting the suspension to give an absorbance reading of less than 0.5 at 650 nm, the absorbances were read at this wavelength on a spectrophotometer. These suspensions were again centrifuged at 19,000×g for 25 minutes, and the resulting pellet was washed into a 30 ml Kjeldahl flask. The flask was placed in a 100° C. oven until dry, and the nitrogen content of the pellet was determined by the micro-Kjeldahl method.

Bacterial protein synthesis from corn stover fractions was also determined under conditions in which no carbohydrate other than that in the stover fractions and in the rumen fluid was added to the tubes (that is, additional glucose was not added). The procedure was the same as that used when excess glucose was added to the tubes, with the exception that the 48 hour tubes were incubated in triplicate rather than in duplicate, and no glucose was added to any of the tubes.

14. In Vitro Ammonia Release Incubation of Stover and Straw

Determination was made of how much ammonia was released into rumen fluid incubation media during incubation with various treated corn stover and wheat straw fractions. The incubations were carried out in 250 ml Erlenmeyer flasks fitted with Bunsen type gas release valves. After the inoculum and substrate were placed in the flasks, $CO_2$ was bubbled through each flask for about a minute, and the gas release valve was fitted into place as the tube carrying $CO_2$ was removed.

The in vitro incubations were conducted in flasks which contained carbohydrate, nitrogen and mineral sources in addition to rumen fluid. In the first study, free $NH_3$ levels produced by incubating corn stover with $NH_4HCO_3$ in rumen fluid were compared to levels produced by incubating an isonitrogenous amount of chlorinated, ammoniated corn stover in rumen fluid. The first flask used in this study (Flask 1; see Table IV) was prepared for incubation by adding, in order, glucose (1.0000 g), $NH_4HCO_3$ (0.3561 g), Hungate's (1950) salt solution a (30.0 ml), hungate's (1950) salt solution B (30.0 ml) and strained rumen fluid (125 ml). The composition of Hungate's salt solutions is given in Table V. Solution B contained $Na_2SO_4$ in place of $(NH_4)_2SO_4$. The flask was then adjusted to pH 6.8 with 10 percent (weight/volume) $NaHCO_3$ and gassed with $CO_2$ as described above. Five more flasks (Flasks 2 through 6; Table IV) were prepared by adding the amounts of carbohydrate and $NH_4HCO_3$ listed in Table IV, and then adding Hungate's salt solutions and rumen fluid as described in Flask 1. The flasks were then incubated at 37° C. in a water bath shaker. Each flask in Table IV was calculated to contain 0.0631 g of added nitrogen before adding rumen fluid (that is, the flasks were isonitrogenous). A 3.0 ml sample of the incubation mixture was taken from each flask at times of 0, 1, 2, 4, 6, 8, 14 and 24 hours after the start of incubation. The sample was filtered through Whatman number 41 filter paper and the filtrate was diluted 1 to 200 in triplicate with water. The diluted filtrate (1.00 ml) was used for free $NH_3$ determination by the alkaline phenate method, as described earlier. It was necessary at the two hour sampling time to dilute the filtrate 1 to 100 instead of 1 to 200, because the absorbance readings were too low at the higher dilution.

TABLE IV

CARBOHYDRATE AND NITROGEN COMPOSITION OF FLASKS USED FOR IN VITRO FREE AMMONIA INCUBATIONS WITH STOVER AND AMMONIUM BICARBONATE[a]

| Flask 1 | 1.0000 g of glucose plus 0.3561 g of $NH_4HCO_3$ |
|---|---|
| Flask 2 | 1.0000 g of stover plus 0.3160 g of $NH_4HCO_3$ |
| Flask 3 | 1.0000 g of chlorinated stover plus 0.3104 g of $NH_4HCO_3$ |
| Flask 4 | 1.0000 g of ammoniated stover plus 0.2427 g of $NH_4HCO_3$ |
| Flask 5 | 1.0000 g of chlorinated, ammoniated stover (39.47% CP) |
| Flask 6 | 1.0000 g of chlorinated, ammoniated stover (39.47% CP) plus 1.0000 g of glucose |

[a] Each uninoculated flask contained 0.0631 grams of nitrogen.

TABLE V

COMPOSITION OF HUNGATE'S SALT SOLUTIONS

| Component | Grams per 100 ml of Solution |
| --- | --- |
| Solution A | |
| $KH_2PO_4$ | 0.3 |
| Modified Solution B | |
| NaCl | 0.6 |
| $Na_2SO_4$ | 0.3 |
| $KH_2PO_4$ | 0.3 |
| $MgSO_4$ | 0.06 |
| $CaCl_2$ | 0.06 |

In another study, free $NH_3$ levels resulting from rumen fluid incubation of corn stover with urea (rather than with $NH_4HCO_3$) were compared to levels resulting from incubation of an isonitrogenous amount of chlorinated, ammoniated corn stover in rumen fluid. The carbohydrate and nitrogen composition of the flasks used in this study is shown in Table VI. After adding carbohydrate and nitrogen, salt solutions and rumen fluid were added in the amounts listed above. Each flask in this study contained 0.1704 g of added nitrogen before adding rumen fluid. Sampling and analysis for $NH_3$ were performed in a manner similar to that used in the first study described above.

TABLE VI

CARBOHYDRATE AND NITROGEN COMPOSITION OF FLASKS USED FOR IN VITRO FREE AMMONIA INCUBATIONS WITH STOVER AND UREA[a]

| | |
| --- | --- |
| Flask 1 | 2.7000 g of starch plus 0.3653 g of urea |
| Flask 2 | 2.7000 g of starch |
| Flask 3 | 2.7000 g of stover plus 0.3242 g of urea |
| Flask 4 | 2.7000 g of chlorinated stover plus 0.3184 g of urea |
| Flask 5 | 2.7000 g of ammoniated stover plus 0.2489 g of urea |
| Flask 6 | 2.7000 g of chlorinated, ammoniated stover (39.47% CP) |
| Flask 7 | 2,7000 g of chlorinated, ammoniated stover (39.47% CP) plus 2.7000 g of starch |

[a]Each uninoculated flask, except Flask 2, contained 0.1704 gram of nitrogen

In a third study, the amount of $NH_3$ released into rumen fluid incubation mixtures by straw with added $NH_4HCO_3$ was compared to the amount released by isonitrogenous chlorinated, ammoniated straw in rumen fluid. The carbohydrate and nitrogen composition of the flasks used in this study is given in Table VII, and each flask contained an equal amount of nitrogen (0.0677 g) before adding rumen fluid. Samples of incubation medium were taken and analyzed for $NH_3$ as described in the first study of this section.

TABLE VII

CARBOHYDRATE AND NITROGEN COMPOSITION OF FLASKS USED FOR IN VITRO FREE AMMONIA INCUBATIONS WITH STRAW AND AMMONIUM BICARBONATE[a]

| | |
| --- | --- |
| Flask 1 | 1.0000 g of glucose plus 0.3821 g of $NH_4HCO_3$ |
| Flask 2 | 1.0000 g of straw plus 0.3482 g of $NH_4HCO_3$ |
| Flask 3 | 1.0000 g of chlorinated straw plus 0.3459 g of $NH_4HCO_3$ |
| Flask 4 | 1.0000 g of ammoniated straw plus 0.3239 g of $NH_4HCO_3$ |
| Flask 5 | 1.0000 g of chlorinated, ammoniated straw (42.32% CP) |

[a]Each uninoculated flask contained 0.0677 grams of nitrogen.

15. Determination of Carbonyl Groups in Treated Stover

A modification of the procedure of Gladding and Purves (1943) (Paper Trade Journal, 116:26) was used to determine the content of carbonyl groups in various treated corn stover fractions. Hydroxylamine hydrochloride reagent was prepared by adding 50.0 g of $NH_2OH.HCl$ to a one liter volumetric flask, dissolving this in water, adding 240 ml of 0.5 N NaOH and diluting to a total volume of exactly one liter with water. A 0.2 g sample of stover or treated stover was accurately weighed into a 250 ml beaker. The $NH_2OH.HCl$ reagent (50.0 ml) was pipetted into each beaker, and into a beaker which contained no added plant material. The beaker contents were stirred with a magnetic stirrer for two hours at room temperature, and were then titrated, while stirring, to pH 3.5 with 0.1 N HCl. The pH was monitored with a pH meter, and triplicate determinations were made on each sample. The difference in the amount of standard acid needed to titrate the blank (no added plant material) and the amount needed to titrate the samples containing added plant material was used to calculate the carbonyl content of the plant fractions.

It was noted that an aqueous dispersion of 0.2 g of plant material treated with NaOCl or $Cl_2$ in 50.0 ml of water was acidic when measured with a pH meter. Since this acidity would interfere with the assay for carbonyl groups in the treated plant material, the acidity was estimated by accurately weighing an aliquot (0.2 g) of treated plant material into a beaker, adding 50.0 ml of water and titrating to pH 7.0 with standardized 0.02 N NaOH. The number of meq of residual acid per g of plant dry matter was calculated, and this value was used to correct the carbonyl content of plant fractions treated with hypochlorite or $Cl_2$ for residual acid in these fractions. Untreated plant fractions, or plant fractions treated with $Cl_2$ plus $NH_3$ had a pH close to neutrality and no correction for residual acid was made.

16. Detection of Imidazoles in Ammonia Treated Stover and Straw Fractions

Imidazoles in ammonia treated plant fractions were detected by paper chromatography using alkaline diazotized sulphanilic acid as a localization reagent. This reagent yields red-brown colors with imidazoles. The reagent also reacts with phenols and is reported to yield yellow colors with ammonium salts. Ammonia-treated plant (0.2 g) was shaken in a test tube containing 5.0 ml of water for five minutes. Water soluble components were separated from the remaining plant material by filtration on a Buchner funnel using Whatman number 41 filter paper. The aqueous extract was then spotted (20 microliters) on Whatman number 1 chromatography paper, after evaporating the extract to approximately one-third of its original volume. An aqueous imidazole solution (5.0 mg per ml) was also spotted (2.5 microliters spotted) as a standard. Plant materials not treated with $NH_3$ were extracted with water as described above, and amounts similar to those used with ammonia-treated plant materials were chromatographed. In addition, 10 microliters of an aqueous (NH$_4$)$_2$SO$_4$ solution (20.0 mg per ml) was spotted.

Descending paper chromatography was carried out using n-butanol-pyridine-water (6:4:3) solvent. The term R$_{im}$ refers to (distance traveled by compound/distance traveled by imidazole). After chromatography for 12 to 15 hours, the papers were removed from the tank, dried, dipped rapidly through sulphanilic acid reagent and dried again. The reagent was prepared by combining one volume of a solution containing 9.0 g of sulphanilic acid and 90 ml of concentrated HCl in 900 ml of water with one volume of 5.0 percent (weight/volume) aqueous sodium nitrite. After allowing to stand for four to five minutes at room temperature, two volumes of 10.0 percent (weight/volume) aqueous anhydrous Na$_2$CO$_3$ were added slowly to the above mixture of sulphanilic acid and sodium nitrite.

17. Dry Matter Determination and Dialysis

Dry matter in plant samples was determined by drying an accurately weighed one gram sample at 100° C. for approximately six hours, and reporting the loss in weight as moisture.

Dialysis was accomplished by making an aqueous slurry of the plant fraction and adding it to a dialysis bag to two-thirds capacity. The bag was tied closed and placed in a four liter beaker filled with water. The slurry was dialyzed for four days, and the four liters of water were changed five times during this period. After dialysis, the contents of the bag were air-dried and analyzed for nitrogen.

18. Guinea Pig Feeding Trials

One week old, male Ducan Hartley Cuinea pigs were randomly selected and assigned to control and treatment groups. These animals were housed in stainless steel cages in groups of four. All cages had been previously sterilized with a 30 minute steam treatment. Fresh food and water were available ad libitum each day in bowls cleaned daily using hot water and detergent, followed by a tap water rinse. Diets were mixed to a spongy consistency by adding water to the dry diet in the bowl and mixing with a spatula. A plastic syringe was used to orally administer 30 mg per day of ascorbic acid in an aqueous solution to each Guinea pig. The animal wastes were collected in trays lined with brown paper and filled with wood chips. The trays were cleaned one to three times per week.

The basal diet used in these Guinea pig feeding trials is shown in Table VIII. The diet was designated number 7960. This diet contains adequate amounts of all known essential nutrients for adequate Guinea pig growth. Isolated soy protein (Promine) was the major source of protein in the diet. Sucrose was added for energy and wood pulp (purified cellulose or "Solka Floc") was added to provide adequate fiber. Vitamins, minerals and other essential nutrients were either added directly to the diet, or were added as a premix (see Table VIII). The composition of these premixes (6063, 4996 and 3607) is given in Tables IX through XI. Experimental diets consisted of the basal diet substituted with a given level of untreated or treated stover. This substitution was made for the whole diet, and the level substituted was expressed as a percentage of the basal diet. As an example, consider the preparation of a basal diet substituted with 5.0 percent corn stover. This diet was prepared by weighing 2.0 kg of the basal diet (7960), adding 105.0 g of corn stover and mixing well. Similar diets substituted with 2.5 percent whole corn plant, 2.5 percent stover and 5.0 percent whole corn plant were prepared, and diets containing the hypochlorite-treated counterparts of these fractions substituted at the same levels were prepared. Diets containing chlorinated, ammoniated stover substituted at levels of 2.5, 5.0, 10.0 and 20.0 percent were prepared. Higher levels of substitution were used in these latter diets to find if the chlorinated, ammoniated stover would depress weight gains at higher levels. Diets substituted with stover fractions were assigned numbers, and these numbers are given in Table XII.

TABLE VIII

COMPOSITION OF BASAL DIET 7960

| Constituents | Percent of Diet[a] |
|---|---|
| Soybean Protein (Promine 5412) | 30.0 |
| Sucrose | 41.3 |
| Wood Pulp ("Solka Floc") | 15.0 |
| Salts Premix (6063) | 5.0 |
| Potassium Acetate | 2.5 |
| Vitamin ADEK Premix (4996) | 2.0 |
| Soybean Oil | 2.0 |
| Vitamin B Premix (3607) | 1.0 |
| Magnesium Oxide | 0.5 |
| DL Methionine | 0.5 |
| Choline Chloride | 0.2 |

[a] As Fed basis

TABLE IX

COMPOSITION OF SALTS PREMIX 6063[a]

| Constituents | Percent of Premix |
|---|---|
| CaHPO$_4$ (anhydrous) | 40.8 |
| CaCO$_3$ | 18.0 |
| KCl | 15.3 |
| Na$_2$HPO$_4$ | 12.8 |
| MgSO$_4$ | 6.0 |
| NaCl | 5.1 |
| MnSO$_4$ . 7H$_2$O | 1.23 |
| Ferric Citrate | 0.72 |
| ZnCO$_3$ | 0.286 |
| KIO$_3$ | 0.034 |
| CuSO$_4$ (anhydrous) | 0.04 |

[a] Purchased from Mallinckrodt Chemical Company, St. Louis, Missouri

TABLE X

COMPOSITION OF VITAMIN ADEK PREMIX 4996

| Constituents | Percent of Premix |
|---|---|
| Soybean Oil | 98.960 |
| "Santoquin" | 0.625 |
| "Myvax" (500,000 Units of Vitamin A/gm) | 0.195 |
| "Dawsterol" (200,000 Unitsof Vitamin D$_3$/gm) | 0.070 |
| Alpha-Tocopheryl Acetate | 0.100 |
| "Menadione" | 0.050 |

TABLE XI

COMPOSITION OF VITAMIN B PREMIX 3607

| Constituents | Amount per Gram of Premix |
|---|---|
| Thiamine HCl | 1.0 milligram |
| Riboflavin | 1.0 milligram |
| Pyridoxine HCl | 1.0 milligram |
| Calcium Pantothenate | 3.0 milligrams |
| Niacin | 5.0 milligrams |
| Inositol | 100.0 milligrams |
| Folic Acid | 0.6 milligram |
| Biotin | 0.2 milligram |
| Cyanocobalamin | 0.003 milligram |

TABLE XI-continued
COMPOSITION OF VITAMIN B PREMIX 3607

| Constituents | Amount per Gram of Premix |
| --- | --- |
| Powdered Sucrose | 0.888 gram |

TABLE XII
IDENTIFICATION OF GUINEA PIG EXPERIMENTAL DIETS

| Diet Description | Identification Number |
| --- | --- |
| Basal | 7960 |
| Basal Substituted with 2.5% Stover | 7961 |
| Basal Substituted with 5.0% Stover | 7962 |
| Basal Substituted with 2.5% Whole Corn Plant | 7963 |
| Basal Substituted with 5.0% Whole Corn Plant | 7964 |
| Basal Substitued with 2.5% Hypochlorite-treated Stover | 7965 |
| Basal Substituted with 5.0% Hypochlorite-treated Stover | 7966 |
| Basal Substituted with 2.5% Hypochlorite-treated Whole Corn Plant | 7967 |
| Basal Substituted with 5.0% Hypochlorite-treated Whole Corn Plant | 7968 |
| Basal Substituted with 2.5% Chlorinated, Ammoniated Stover | 7969 |
| Basal Substituted with 5.0% Chlorinated, Ammoniated Stover | 7970 |
| Basal Substituted with 10.0% Chlorinated, Ammoniated Stover | 7971 |
| Basal Substitued with 20.0% Chlorinated, Ammoniated Stover | 7972 |

The Guinea pigs were weighed at the start of the trial and weekly thereafter. Each feeding trial lasted four weeks, and data from multiple trials, where animals were fed the same diet in each trial, were pooled for statistical analysis. Feeding trials with untreated and hypochlorite-treated stover were repeated at least once, while trials with chlorinated, ammoniated stover were not repeated. At the end of each trial, Guinea pig blood samples were taken for NH3 analysis. The animals were anesthetized in a clean, ventilated desiccator containing added diethyl ether.

19. Sheep Feeding Trials

Ammonia toxicity studies were conducted with six mature fistulated wethers weighing an average of 78 kg. The animals were fed a hay diet and kept together in a pen prior to the feeding trials. The sheep were placed in individual metabolism crates and were fed a high energy diet containing urea for a four week adaptation period. The composition of this diet is given in Table XIII. Crimped corn supplied the energy in this diet, while cottonseed hulls were the major source of roughage, and soybean meal and urea supplied most of the nitrogen. Samples of the ration were collected at various times throughout the trial for dry matter and nitrogen determinations.

TABLE XIII
INGREDIENT COMPOSITION OF SHEET UREA ADAPTATION DIET

| Ingredient | International Reference Number | Percent of Diet[a] |
| --- | --- | --- |
| Crimped Corn | 402879 | 57.00 |
| Cottonseed Hulls | 101599 | 23.00 |
| Soybean Meal | 504600 | 11.00 |
| Molasses | 404696 | 5.00 |
| Urea | | 1.50 |
| Salt | | 1.00 |
| Dicalcium Phosphate | 601080 | 0.65 |
| Calcium Carbonate | 601069 | 0.35 |
| Sodium Sulfate | 604292 | 0.50 |

[a]As fed basis.

The sheep were initially fed all of the diet that they would eat for two one hour periods per day during the first four days of adaptation, but one or two of the animals developed diarrhea, presumably due to overconsumption of the diet. The amount fed was then adjusted to 400 g per feeding period, and was increased by 50 g per feeding period until the sheep were refusing 10 percent of the diet offered per feeding period. The sheep were fed twice daily, once in the morning at about 8:30 a.m., and once in the afternoon at about 3:45 p.m. They were allowed to consume the diet for one hour, and then the feed boxes were removed. The animals were provided with fresh water twice daily, and were removed from the crates and exercised two weeks after the start of the adaptation period.

After this four week adaptation period, the sheep were divided into two groups of three, and one group was fed the control diet whose composition is given in the first column of Table XIV, while the other group was fed the experimental diet described in the second column of Table XIV. These diets were similar to the diet fed during the four week adaptation period, except that corn stover or treated corn stover replaced cottonseed hulls as the major roughage source in the diet.

TABLE XIV
INGREDIENT COMPOSITION OF SHEEP HIGH STOVER CONTROL AND EXPERIMENTAL DIETS

| Ingredients | International Reference Number | Percent of Diet[a] | |
| --- | --- | --- | --- |
| | | Control | Experimental |
| Crimped Corn | 402879 | 57.47 | 58.30 |
| Cottonseed Hulls | 101599 | 13.12 | 13.31 |
| Soybean Meal | 504600 | 10.08 | 10.23 |
| Corn Stover | 102776 | 10.48 | |
| Chlorinated, Ammoniated Stover | | | 10.50 |
| Molasses | 404696 | 5.04 | 5.11 |
| Urea | | 1.30 | |
| Salt | | 1.01 | 1.02 |
| Dicalcium Phosphate | 601080 | 0.65 | 0.66 |
| Calcium Carbonate | 601069 | 0.35 | 0.36 |
| Sodium Sulfate | 604292 | 0.50 | 0.51 |

[a]As fed basis.

After 11 days of adaptation to the diets of Table XIV, rumen fluid and blood samples were collected from the sheep before the morning feeding and at various time intervals after feeding. Control and experimental animals were paired, and samples were collected from one control and one experimental animal on each of three consecutive days following the 11 day adaptation period. On the day of sampling, the amount of feed offered to the sheep consuming the control diet was reduced so that the control and experimental animals were consuming approximately the same amount of nitrogen per kilogram of body weight during the feeding period. This reduction was necessary because experimental animals in two of the three paired groups consumed considerably less feed than the controls. Rumen fluid samples were collected before feeding and at 30 minute intervals for the first three hours after placing feed in front of the sheep. A final rumen sample was collected at four hours after feeding.

Rumen fluid samples were obtained by straining whole rumen contents of the sheep through four layers of cheesecloth. The rumen contents were obtained via rumen fistula. The pH of the rumen fluid was determined within five minutes of sampling with a Corning model 5 pH meter. The rumen fluid was then acidified by adding approximately 0.5 ml of concentrated $H_2SO_4$ per 50 ml of rumen fluid collected. The acid was used as a preservative for later chemical determinations. The acidified rumen fluid samples were kept on ice until sampling was completed for the day. The rumen fluid samples were then centrifuged at 20,000×g for 20 minutes to reduce cloudiness in the samples and thereby aid in further chemical analyses. After centrifugation the samples were frozen in glass test tubes capped with parafilm until they were analyzed.

Blood samples were collected at the same time as rumen samples, and additionally at five and six hours after feeding. On the day of sampling, the necks of the control and experimental sheep were sheared, and an intraveous catheter (Vicra Sterile, Incorporated) was placed in the jugular vein of the sheep. The catheter was sutured in place. Water was available to the sheep at all times during these feeding trials, except during feeding and sampling periods. The animals were not allowed to drink water during these periods.

Blood samples were collected in a 12 ml plastic syringe that had been rinsed with 10 percent (weight-/volume) potassium oxalate. Blood samples were obtained by injecting approximately 0.5 ml of oxalate into the catheter to prevent clotting, withdrawing approximately 10 ml of blood into the oxalate-rinsed syringe and transferring the blood immediately to oxalate-coated glass centrifuge tubes. Centrifuge tubes were coated with oxalate by adding 0.2 ml of 10 percent (weight/volume) potassium oxalate to the tubes and drying the tubes in a 100° C. oven overnight. Oxalate in the centrifuge tubes was mixed with the blood by stirring with a glass rod. The oxalated blood was then centrifuged at approximately 4000×g for 10 minutes to separate red blood cells from plasma, and the plasma was transferred to a culture tube with a screw-on cap. The plasma samples were kept on ice until daily sample collections were completed. The samples were then frozen until they were analyzed.

Rumen samples were diluted 1 to 100 with water just prior to analysis for $NH_3$. Blood samples were analyzed for $NH_3$ and urea without dilution. Procedures for analysis of $NH_3$ and urea in sheep blood and rumen fluid were described previously. Samples were analyzed in triplicate.

Two of the three sheep assigned to the experimental diet described in Table XIV consumed the diet poorly. For this reason, another $NH_3$ toxicity study was conducted in a manner similar to the one just described, with the exception that the level of untreated or treated stover feed was greatly reduced. The composition of control and experimental diets fed during this study is given in Table XV. Animals that had been consuming experimental diets in the previous study were assigned to control diets in the present study, while control animals in the previous study were now fed the experimental diets. The sheep were adapted to the diets described in Table XV for an 11 day period; blood and rumen fluid samples were collected on three consecutive days following the adaptation period. Animals were paired as described in the previous study, and sampling procedures were identical to those described in the previous study. The two sheep composing each pair were offered the same amount of feed nitrogen per kg of body weight per day. The amount of daily nitrogen offered was the same as that amount consumed by the animal in each pair consuming the least amount of nitrogen per day. Feed refusals were weighed and the weights were recorded after each feeding period. Sheep were weighed at the end of the urea adaptation period, and at weekly intervals thereafter.

TABLE XV

INGREDIENT COMPOSITION OF SHEEP LOW STOVER CONTROL AND EXPERIMENTAL DIETS

| Ingredients | International Reference Number | Percent of Diet[a] | |
|---|---|---|---|
| | | Control | Experimental |
| Crimped Corn | 402879 | 61.88 | 61.49 |
| Cottonseed Hulls | 101599 | 14.13 | 14.04 |
| Soybean Meal | 504600 | 10.86 | 10.79 |
| Corn Stover | 102776 | 5.00 | |
| Chlorinated, Ammoniated Stover | | | 5.00 |
| Molasses | 404696 | 5.42 | 5.39 |
| Urea | | | 0.60 |
| Salt | | 1.08 | 1.08 |
| Dicalcium Phosphate | 601080 | 0.70 | 0.70 |
| Calcium Carbonate | 601069 | 0.38 | 0.38 |
| Sodium Sulfate | 604292 | 0.54 | 0.54 |

[a]As fed basis.

RESULTS

A. CORN STOVER AND WHEAT STRAW STUDIES

1. Physical Characteristics of Treated Corn Stover and Wheat Straw

Corn stover (Hybrid Cargill 920) or wheat straw treated with $Cl_2$ and $NH_3$ underwent a series of characteristic color changes during treatment with each of these gases. The wet corn stover, containing between 20 and 35 percent dry matter, changed from a dark brown to a tan or orange color when exposed to $Cl_2$ gas. Upon subsequent exposure of the chlorinated stover to $NH_3$, the material changed from a tan to a dark brown color; generally this color was darker than that of the untreated wet stover. These color changes occurred during treatment in both plastic bags and glass columns. The process of corn stover chlorination resulted in a 99.7 percent yield of chlorinated stover, while chlorination followed by ammoniation resulted in an overall yield of 107.8 percent. A 75 g stover sample was used to collect data for chlorination yield calculations, while a 0.5 g sample was used for chlorination, ammoniation yield calculations.

Corn stover was ground to pass through a one millimeter screen before chlorination and ammoniation, whereas wheat straw was not ground before chlorination and ammoniation. The straw was, however, ground after treatment to pass through a one millimeter screen. The dry matter content of untreated corn stover and wheat straw used in all the experiments reported here is given in Table XVI. This table also gives the percentage of dry matter in the stover and straw after adding water to reduce the dry matter, but before any treatment procedure. Finally, the table presents the percentage of dry matter in the stover and straw after chlorination, ammoniation and air-drying. It was necessary to add water to the stover or straw to give 20 to 30 percent dry matter before a reaction with $Cl_2$ or $NH_3$ would take place. There was no apparent reaction when the dry plant material was chlorinated or ammoniated.

TABLE XVI
DRY MATTER CONTENT OF UNTREATED AND TREATED CORN STOVER AND WHEAT STRAW

| Plant Fraction | Percentage of Dry Matter |
|---|---|
| Corn Stover[a] | 94.19 |
| Wheat Straw | 92.72 |
| Corn Stover with Added Water[b] | 24.66 |
| Wheat Straw with Added Water[b] | 21.78 |
| Chlorinated, Ammoniated Corn Stover[c] | 82.94 |
| Chlorinated, Ammoniated Wheat Straw[c] | 89.02 |

[a]Partially dried at 50° C.
[b]Water was added to reduce the dry matter content of these fractions before chlorination or ammoniation.
[c]Plant material was air-dried after chlorination and ammoniation.

2. Carbonyl Content of Corn Stover Treated with Hypochlorite or Chlorine

The content of carbonyl groups in corn stover treated with hypochlorite, $Cl_2$ or a combination of $Cl_2$ and $NH_3$ is shown in Table XVII. Hypochlorite or $Cl_2$ treatment of corn stover caused the content of carbonyl groups in the stover to increase.

TABLE XVII
CARBONYL CONTENT OF UNTREATED, HYROCHLORITE-TREATED AND CHLORINE-TREATED CORN STOVER

| Treatment | Carbonyl Content[a] |
|---|---|
| Untreated Stover | 1.55 ( 1.19, 1.91) |
| Hypochlorite-treated Stover | 11.24 (11.19, 11.29) |
| Chlorine-treated Stover | 19.24 (17.74, 20.73) |
| Chlorinated, Ammoniated Stover | 0 (0,0) |

[a]Moles of carbonyl groups per 100 anhydroglucose units of stover dry matter. Mean and individual values (in parentheses) of duplicate determinations.

3. Crude Protein and Free Ammonia Content of Treated Corn Stover and Wheat Straw The percentages of crude protein (percentage of nitrogen multiplied by 6.25) in untreated corn stover and wheat straw, in hypochlorite-treated corn stover and wheat straw, and in chlorinated corn stover and wheat straw are presented in Table XVIII. These data show that hypochlorite treatment of corn stover caused the crude protein content of the stover to decrease. This decrease was due to solubilization of the corn stover crude protein by hypochlorite.

TABLE XVIII
CRUDE PROTEIN CONTENT OF UNTREATED, HYPOCHLORITE-TREATED AND CHLORINATED CORN STOVER AND WHEAT STRAW

| Plant Fraction | Treatment | Percent Crude Protein[a] |
|---|---|---|
| Corn Stover | Untreated | 4.41 (4.37, 4.41, 4.44) |
| | Aqueous Hypochlorite | 2.88 (2.79, 2.97) |
| | Chlorine-Plastic Bag | 5.06 (5.02, 5.13) |
| Wheat Straw | Untreated | 3.77 (3.54, 3.80, 3.96) |
| | Chlorine-Plastic Bag | 4.01 (3.92, 3.94, 4.18) |

[a]Mean and individual values (in parentheses) of duplicate or triplicate determinations. Values are expressed on a dry matter basis.

Table XVIII shows that chlorination of wheat straw also caused the crude protein percentage of the wheat straw to increase slightly. The reason for this increase in the crude protein percentage of stover or straw after chlorination is not known. The chlorinated material may have bound a small amount of $NH_3$ present in the air of the laboratory, where $NH_3$ gas was frequently used.

The percentage of crude protein in untreated corn stover and wheat straw, in corn stover treated with hypochlorite followed by aqueous $NH_3$, and in corn stover and wheat straw treated with $Cl_2$ gas followed by $NH_3$ gas is given in Table XIX. The crude protein percentage of corn stover treated with aqueous $NH_3$ only is given in Table XX. This latter table also gives the percentage of crude protein in corn stover and wheat straw treated with $NH_3$ gas only, without previous treatment with $Cl_2$ gas. Table XIX reveals that hypochlorite treatment of corn stover, followed by treatment with aqueous $NH_3$, significantly increased the content of crude protein in the stover (P<0.05). After treatment with $Cl_2$ gas followed by $NH_3$ gas, stover and straw had higher levels of crude protein than their untreated counterparts. The levels of crude protein is chlorinated, ammoniated stover and straw were substantially higher than levels reported elsewhere for stover (Oji et al., 1977, J. Anim. Sci., 44:798) or straw (Waiss et al., 1972, J. Anim. Sci., 35:109) treated with $NH_3$ alone. The levels of crude protein were similar in all chlorinated, ammoniated products.

TABLE XIX
CRUDE PROTEIN CONTENT OF UNTREATED, HYPOCHLORITE-AMMONIA AND CHLORINE-AMMONIA TREATED CORN STOVER AND WHEAT STRAW

| Plant Fraction | Treatment | Percent Crude Protein |
|---|---|---|
| Corn Stover | Untreated | 4.41 ± 0.03[b] |
| | Hypochlorite-Ammonia (aqueous) | 14.51 ± 0.29[c] |
| | Chlorine-Ammonia[a] | 39.47 ± 0.06[d] |
| Wheat Straw | Untreated | 3.77 ± 0.21[b] |
| | Chlorine-Ammonia[a] | 42.32 ± 0.46[c] |

[a]Treated in a plastic bag.
[b,c,d]Mean values within each plant fraction that do not have a common letter in the superscript are different (P < 0.05). Mean and sample standard deviation of triplicate determinations. Values are expressed on a dry matter basis.

TABLE XX
CRUDE PROTEIN CONTENT OF UNTREATED AND AMMONIATED CORN STOVER AND WHEAT STRAW

| Plant Fraction | Treatment | Percent Crude Protein |
|---|---|---|
| Corn Stover | Untreated | 4.41 ± 0.03[b] |
| | Aqueous Ammonia | 7.78 ± 0.07[c] |
| | Gaseous Ammonia[a] | 12.59 ± 0.43[d] |
| Wheat Straw | Untreated | 3.77 ± 0.21[b] |

TABLE XX-continued

CRUDE PROTEIN CONTENT OF UNTREATED AND
AMMONIATED CORN STOVER AND WHEAT STRAW

| Plant Fraction | Treatment | Percent Crude Protein |
|---|---|---|
| | Gaseous Ammonia[a] | 6.44 ± 0.18[a] |

[a]Treated in a plastic bag.
[b,c,d]Mean values within each plant fraction that do not have a common letter in the superscript are different (P < 0.05). Mean and sample standard deviation of triplicate determinations. Values are expressed on a dry matter basis.

A sample of untreated corn stover obtained from an earlier lot, and containing a percentage of crude protein different from that of the other untreated stover used in these studies, was placed in a glass column after adding water to a dry matter level of approximately 25 percent. The stover was then chlorinated and ammoniated while in the glass column as described earlier. The crude protein content of this stover before and after various gaseous treatments is presented in Table XXI.

TABLE XXI

CRUDE PROTEIN CONTENT OF UNTREATED AND
CHLORINATED, AMMONIATED CORN STOVER
TREATED IN A GLASS COLUMN

| Treatment | Percent Crude Protein[c] |
|---|---|
| Untreated | 7.20 (7.09, 7.31) |
| Chlorine Gas | 6.32 (6.31, 6.32) |
| Chlorine-Ammonia[a] | 38.78 (38.01, 39.54) |
| Chlorine-Ammonia[b] | 35.56 (35.12, 35.99) |

[a]Air-dried for 16 hours after treatment.
[b]Air-dried for 3-5 days after treatment, and then dried in a vacuum oven at 50° C. for 16 hours.
[c]Mean and individual values (in parentheses) of duplicate determinations. Values are expressed on a dry matter basis.

The crude protein level in corn stover treated with $Cl_2$ and $NH_3$ for Guinea pig feeding trials dropped from 32.25 percent to 25.2 percent after nine months of storage in a plastic bag. The bag was opened occasionally to remove treated stover for feeding and sampling purposes, but otherwise the bag was tied tightly with a string during the nine month period.

Table XX demonstrates that if corn stover is treated with aqueous $NH_3$ its crude protein content increases, but the increase is not as great as that seen when stover is treated first with hypochlorite and then with aqueous $NH_3$. Similarly, when wet stover or straw was treated with gaseous $NH_3$, its content of crude protein increased. Treatment of the stover or straw with $Cl_2$ gas followed by $NH_3$ gas, however, led to a much larger increase in crude protein than did treatment with $NH_3$ gas alone.

The percentages of crude protein in stover treated with $Cl_2$ and $NH_3$ gases by two different methods, and then dialyzed against deionized water, are shown in Table XXII. This table also shows the percentage of crude protein in corn stover treated with $NH_3$ gas alone, and then dialyzed against deionized water. These data indicate that the majority of nitrogen taken up by corn stover during the process of chlorination and ammoniation, or during the process of ammoniation alone, was present either as free $NH_3$ or as a low molecular weight form of bound $NH_3$ that passed from the dialysis bag. There was, however, an increase in the amount of non-dialyzable crude protein in the stover, after the stover was either ammoniated or chlorinated and ammoniated. The content of non-dialyzable crude protein in chlorinated, ammoniated stover was slightly higher than the content in ammoniated stover (Table XXII). The difference between the percentage of non-dialyzable crude protein in treated stover and the percentage of crude protein in untreated stover represents the amount of $NH_3$ that was bound to a higher molecular weight fraction of the stover. If this bound $NH_3$ were to be released more slowly than the $NH_3$ of other nonprotein nitrogen sources in the rumen, then chlorinated, ammoniated stover would be a potentially valuable ruminant feed additive. Slow $NH_3$ release from nonprotein nitrogen in the rumen is desirable because, as mentioned earlier, the hydrolysis rate of most nonprotein nitrogen sources in the rumen is much faster than the rate that rumen bacteria can assimilate $NH_3$ into protein. The $NH_3$ not assimilated is lost to the ruminant, and can lead to $NH_3$ toxicity.

TABLE XXII

CRUDE PROTEIN CONTENT OF UNTREATED
AND TREATED, DIALYZED CORN STOVER

| Treatment | Percent Crude Protein[c] |
|---|---|
| Untreated | 4.41 (4.37, 4.41, 4.44) |
| Gaseous Ammonia, Dialysis[a] | 6.02 (5.55, 6.48) |
| Chlorine-Ammonia, Dialysis[a] | 7.68 (7.54, 7.82) |
| Chlorine-Ammonia, Dialysis[b] | 8.70 (8.55, 8.84) |

[a]Treated in a small plastic bag and then dialyzed.
[b]Treated in a large plastic bag for Guinea pig feeding trials, and then dialyzed.
[c]Mean and individual values (in parentheses) of duplicate or triplicate determinations. Values are expressed on a dry matter basis.

The percent of crude protein due to free $NH_3$ in corn stover treated with $NH_3$ gas or with $Cl_2$ gas followed by $NH_3$ gas is shown in Table XXIII. The results of this study are similar to results obtained when treated stover was subjected to dialysis, in that they show that the majority of crude protein in chlorinated, ammoniated stover is present as free $NH_3$. This free $NH_3$ may, however, have been physically or chemically bound to the stover initially, and then released by the relatively harsh conditions employed in the MgO distillation procedure used to determine free $NH_3$. Magnesium oxide distillation may thus give false high free $NH_3$ values in ammoniated plant samples.

TABLE XXIII

FREE AMMONIA CONTENT OF
UNTREATED AND TREATED CORN STOVER

| Treatment | Free Ammonia Nitrogen (%)[d] | Percent of Total Crude Protein as Free Ammonia[a] |
|---|---|---|
| Untreated | 0 | 0 |
| Gaseous Ammonia[b] | 0.49 ± 0.01 | 24.3 |
| Chlorine-Ammonia[b] | 4.45 ± 0.04 | 70.4 |
| Chlorine-Ammonia[c] | 3.85 ± 0.03 | 74.3 |

[a] $\frac{(\% \text{ Free Ammonia Nitrogen})(6.25)(100)}{\% \text{ Crude Protein in Treated Stover}}$
[b]Treated in a small plastic bag.
[c]Treated in a large plastic bag for Guinea pig feeding trials.
[d]Mean and sample standard deviation of triplicate determinations.

Free $NH_3$ or dialyzable crude protein in ammoniated or chlorinated, ammoniated corn stover is also potentially valuable to the ruminant, provided that this product containing excess free $NH_3$ in fed under conditions where it is efficiently utilized for bacterial protein synthesis, and conditions where it will not lead to $NH_3$ toxicity. Chlorinated, ammoniated corn stover has a neutral pH in an aqueous slurry, so the product should not have an adverse effect on rumen pH, since rumen pH is also near neutrality. If $NH_3$ is hydrolyzed from the treated stover at a rate in excess of the rate that rumen bacteria can use it for protein synthesis, however, toxicity problems might result. Such toxicity is seen when urea is hydrolyzed to $NH_3$ in the rumen shortly after feeding excess urea to ruminants. This hydrolysis and resultant production of excess rumen $NH_3$ will cause the rumen pH to rise, and will lead to $NH_3$ toxicity.

The chemical reactions that occur when chlorinated corn stover is treated with gaseous $NH_3$ are not known with certainty. Since chlorinated stover is so much more reactive with $NH_3$ than is untreated stover, the chlorination process must produce functional groups that are very reactive with $NH_3$. The carbonyl groups that were found in increased concentrations after corn stover was chlorinated may have been responsible for the reaction with some of the $NH_3$ when chlorinated corn stover was ammoniated. Table XVII shows that the carbonyl content of chlorinated, ammoniated corn stover was much lower than that of chlorinated corn stover, indicating that $NH_3$ may have reacted with carbonyl groups in the chlorinated stover. Table XXIV presents the theoretical percentage of crude protein expected if all the carbonyl groups found in hypochlorite and chlorine-treated corn stover were to react with $NH_3$. These data reveal that the percent of ammonia-free crude protein actually found in chlorinated, ammoniated corn stover was lower than the amount calculated by assuming that all carbonyl groups in the chlorinated stover react with $NH_3$. The percent of total crude protein in chlorinated, ammoniated stover (including crude protein due to free $NH_3$) was, however, much higher than the calculated theoretical percentage.

TABLE XXIV

A COMPARISON OF THEORETICAL AND OBSERVED VALUES OF PERCENT CRUDE PROTEIN IN HYPOCHLORITE-AMMONIA AND CHLORINE-AMMONIA TREATED CORN STOVER

| | Treatment | |
|---|---|---|
| | Hypochlorite-Ammonia | Chlorine-Ammonia |
| % N in Hypochlorite or Chlorine-treated Corn Stover | 0.47 | 0.81 |
| Theoretical % N Incorporated into Carbonyls[a] | 0.97 | 1.66 |
| Theoretical % N in Product[b] | 1.44 | 2.47 |
| Theoretical % CP in Product | 9.00 | 15.44 |
| Observed % Ammonia-free CP in Product | 8.44 | 11.68 |
| % of Maximum Theoretical Incorporation | 93.78 | 75.65 |

[a]Calculated as follows, assuming a carbonyl content of 19.24 moles of carbonyl per 100 anhydroglucose units:
$$\frac{(19.24)}{100} \cdot \frac{(14.07)}{162.14} \cdot (100) = 1.66\% \text{ N}$$
[b]Sum of first two rows.

Table XXV summarizes the crude protein content of corn stover treated with various combinations of hypochlorite, $Cl_2$ and $NH_3$.

TABLE XXV

SUMMARY OF CRUDE PROTEIN CONTENT OF TREATED CORN STOVER

| Treatment | | | | |
|---|---|---|---|---|
| Untreated | Hypochlorite | Chlorine | Ammonia | % CP |
| X | | | | 4.41 |
| | X | | | 2.88 |
| | | X | | 5.06 |
| | | | X[a] | 14.51 |
| | X | | X[b] | 39.47 |
| | | | X[a] | 7.78 |

TABLE XXV-continued

SUMMARY OF CRUDE PROTEIN CONTENT OF TREATED CORN STOVER

| Treatment | | | | |
|---|---|---|---|---|
| Untreated | Hypochlorite | Chlorine | Ammonia | % CP |
| | | | X[b] | 12.59 |

[a]Treated with aqueous ammonia.
[b]Treated with gaseous ammonia.

4. Detection of Imidazoles in Treated Corn Stover

Corn stover treated with $NH_3$ gas or with $Cl_2$ and $NH_3$ gases was tested for the presence of imidazoles by paper chromatography, after extracting the treated stover with water. The results of this test are presented in Table XXVI. Water extracts of corn stover treated with $Cl_2$ and $NH_3$ did not show an orange or brown spot when paper chromatograms of the extracts were sprayed with an imidazole color reagent. Water extracts of a similar amount of ammoniated stover gave a brown spot when sprayed with imidazole color reagent. The $R_{im}$ (see Table XXVI for explanation) of this spot was 0.93, and the spot was not identified. No extra spots were observed when the plant samples in Table XXVI were extracted with dilute acid instead of water. Imidazoles, if present in the samples, would be more soluble in dilute acid than in water. Ether extraction of the aqueous slurries of these same samples also had no effect on the paper chromatograms of the samples.

TABLE XXVI

RESULTS OF TEST FOR IMIDAZOLES IN TREATED CORN STOVER

| Material Spotted | Volume Spotted (μl) | Spot Color | $R_{im}$[a] |
|---|---|---|---|
| Imidazole (5 mg/ml) | 2.5 | Orange | 1.00 |
| $(NH_4)_2SO_4$ (20 mg/ml) | 10.0 | Yellow | 0.04 |
| Corn Stover | 20.0 | None | |
| Chlorinated Corn Stover | 20.0 | None | |
| Ammoniated Corn Stover | 20.0 | Brown | 0.93 |
| Chlorinated, Ammoniated Corn Stover | 20.0 | Orange (faint) | 1.18 |
| | 20.0 | Yellow | 0.35 |

[a]$R_{im} = \frac{\text{Distance traveled by material spotted}}{\text{Distance traveled by imidazole}}$ Stover treated with $Cl_2$ and $NH_3$ gave a yellow spot after chromatography and spraying with imidazole color reagent. Paper chromatography of an $(NH_4)_2SO_4$ solution, followed by spraying with the reagent, gave a yellow spot with $R_{im}$ of 0.04. The results of this study indicate that chlorinated, ammoniated stover may contain an ammonium salt, but the results do not indicate the presence of imidazoles.

5. In Vitro Dry Matter Digestibility of Treated Corn Stover and Wheat Straw

The in vitro dry matter digestibility of "Solka Floc", untreated corn stover and various fractions of treated corn stover are shown in Table XXVII. These data indicate that hypochlorite treatment of corn stover decreased the digestibility of the stover ($P<0.05$), whereas treatment with aqueous $NH_3$ or with hypochlorite followed by aqueous $NH_3$ increased the digestability over that of untreated stover ($P<0.05$). The results of an earlier study indicated that digestibilities of untreated stover and stover treated with hypochlorite followed by aqueous NH₃ were lower than the values found in the present study. A different method and different corn stover samples were used in the earlier studies; these differences may have accounted for the lower digestibilities observed in the earlier study.

TABLE XXVII
IN VITRO DRY MATTER DIGESTIBILITIES OF UNTREATED AND TREATED CORN STOVER

| Treatment | In Vitro Dry Matter Digestibility (%)[a] |
|---|---|
| A. Aqueous Treatments | |
| Untreated Stover | 47.11 ± 1.50[c] |
| Hypochlorite | 32.16 ± 0.68[b] |
| Ammonia | 56.33 ± 0.60[d] |
| Hypochlorite-Ammonia | 57.11 ± 2.79[d] |
| "Solka Floc" (Untreated) | 77.94 ± 2.16[e] |
| B. Gaseous Treatments | |
| Untreated Stover | 47.11 ± 1.50[g] |
| Chlorine | 35.03 ± 0.40[f] |
| Ammonia | 60.69 ± 0.11[h] |
| Chlorine-Ammonia | 45.12 ± 1.63[g] |
| "Solka Floc" (Untreated) | 77.94 ± 2.16[i] |

[a]Mean and sample standard deviation of triplicate determinations.
[b,c,d,e]Mean values for aqueous treatments that do not have a common letter in the superscript are different ($P < 0.05$).
[f,g,h,i]Mean values for gaseous treatments that do not have a common letter in the superscript are different ($P < 0.05$).

Table XXVII reveals that chlorination of corn stover reduced its digestibility ($P<0.05$). Ammoniation increased digestibility ($P<0.05$), and treatment with $Cl_2$ gas followed by $NH_3$ gas had no significant effect on corn stover digestibility. The decreased digestibility seen when corn stover was treated with aqueous hypochlorite or with $Cl_2$ gas may have been due to residual $Cl_2$ or hypochlorite remaining in the stover after treatment. Treatment of chlorinated corn stover with $NH_3$ gas increased the digestibility of the corn stover, but chlorinated, ammoniated stover digestibility was not increased over that of untreated stover. The $NH_3$ gas may have reacted with some of the residual $Cl_2$ in the chlorinated stover, thereby making it less toxic to rumen microorganisms, and allowing them to more readily degrade the stover.

The digestibilities of treated and untreated wheat straw fractions are presented in Table XXVIII. The digestibility of wheat straw was increased when the straw was chlorinated. Treatment of straw with $NH_3$ gas resulted in a significant increase in digestibility, whereas the digestibility did not change when straw was treated with $Cl_2$ gas followed by $NH_3$ gas.

TABLE XXVIII
IN VITRO DRY MATTER DIGESTIBILITIES OF UNTREATED AND TREATED WHEAT STRAW

| Treatment | In Vitro Dry Matter Digestibility (%)[a] |
|---|---|
| Untreated | 26.90 ± 5.34[b] |
| Chlorine Gas | 32.40 ± 1.82[c] |
| Ammonia Gas | 43.30 ± 0.76[d] |
| Chlorine-Ammonia | 30.40 ± 1.83[b, c] |
| "Solka Floc" (Untreated) | 76.44 ± 1.82[e] |

[a]Mean and sample standard deviation of triplicate determinations.
[b,c,d,e]Mean values that do not have a common letter in the superscript are different ($P < 0.05$).

The results of this study indicate that $NH_3$ gas treatment is superior to treatment with a combination of $Cl_2$ and $NH_3$ gases, when the goal of the treatment is to increase the digestibility of corn stover or wheat straw.

6. Bacterial Protein Synthesis Using Corn Stover Substrate

Rumen bacteria were isolated from in vitro incubation mixtures containing rumen fluid and various fractions of untreated and chemically treated corn stover. The absorbance of an aqueous suspension of these bacteria was determined, and an aliquot of the bacteria from this aqueous suspension was analyzed for crude protein. The absorbance of an aqueous suspension of bacteria isolated from these incubation mixtures would be a measure of the mass of bacterial cells produced during the incubation period. Similarly, the crude protein content of isolated bacteria would be an estimate of the bacterial protein synthesized by rumen bacteria during incubation. The in vitro incubations were conducted with or without excess carbohydrate present as glucose. Urea was added to each incubation mixture as needed, so that the amount of nitrogen in each incubation tube was equal at the start of incubation.

The region of linearity of absorbance versus cell mass was plotted. Bacterial suspensions were diluted to give absorbance readings falling on the linear portion of the plot. The absorbance of aqueous suspensions of bacteria isolated from incubation mixtures containing treated corn stover fractions and rumen fluid, without added glucose, are given in Table XXIX. The chief source of energy in these incubation mixtures was untreated or treated corn stover, and the chief nitrogen source was either urea or the nitrogen of the treated stover. The amounts of untreated corn stover and urea added to incubation tubes used in this study are shown in Table XXX. The data in Table XXIX indicate that chlorinated corn stover, when compared to untreated corn stover, was not as useful an energy source for the production of bacterial cell mass. Perhaps, as noted in the previous section, some residual $Cl_2$ remained in the chlorinated stover and inhibited microbial activity enough to cause the observed decrease in bacterial cell mass.

TABLE XXIX
ABSORBANCES OF AQUEOUS BACTERIAL SUSPENSIONS RESULTING FROM IN VITRO INCUBATIONS OF TREATED CORN STOVER WITH RUMEN FLUID IN THE ABSENCE OF GLUCOSE

| Added Substrate Incubated | Absorbance[a] |
|---|---|
| No carbohydrate or Urea | −0.0508 ± 0.0038 |
| Urea but No Carbohydrate | 0.0118 ± 0.0014[b] |
| Corn Stover Plus Urea | 0.4642 ± 0.0365[e] |
| Chlorinated Corn Stover Plus Urea | 0.2423 ± 0.0075[c] |
| Ammoniated Corn Stover Plus Urea | 0.5277 ± 0.0312[f] |
| Chlorinated, Ammoniated Corn Stover No Urea | 0.3094 ± 0.0075[d] |

[a]Minus absorbance of blank.
[b,c,d,e,f]Mean values that do not have a common letter in the superscript are different ($P < 0.05$). Mean and sample standard deviation of triplicate determinations

TABLE XXX
CARBOHYDRATE AND NITROGEN COMPOSITION OF INCUBATION MIXTURES USED FOR CORN STOVER BACTERIAL PROTEIN SYNTHESIS DETERMINATION[a]

| Mixture | Composition |
|---|---|
| 1 | No carbohydrate or urea |
| 2 | 40.6 mg of urea and no carbohydrate |
| 3 | 0.3000 g of corn stover plus 36.0 m of urea |
| 4 | 0.3000 g of chlorinated corn stover 35.4 mg of urea |
| 5 | 0.3000 g of ammoniated corn stover plus 27.7 mg of urea |

TABLE XXX-continued

CARBOHYDRATE AND NITROGEN COMPOSITION OF INCUBATION MIXTURES USED FOR CORN STOVER BACTERIAL PROTEIN SYNTHESIS DETERMINATION[a]

| Mixture | Composition |
| --- | --- |
| 6 | 0.3000 g of chlorinated, ammoniated corn stover and no urea |

[a]Each uninoculated mixture, except Mixture 1, contained 0.0189 grams of nitrogen Corn stover treated with $NH_3$ gas was better utilized (P<0.05) than untreated, chlorinated or chlorinated, ammoniated corn stover as a carbohydrate and nitrogen source for synthesis of bacterial cell mass (see Table XXIX). Since ammoniation of corn stover also increased its digestibility, the more easily digested ammoniated stover may have been more readily converted into bacterial cell mass than other untreated and treated stover fractions. Chlorinated, ammoniated corn stover was better utilized as a carbohydrate and nitrogen source for the production of bacterial cell mass than was chlorinated corn stover, but was not used as well as untreated corn stover or ammoniated corn stover for this purpose.

Estimates of the amount of bacterial protein synthesized in vitro by rumen bacteria using the carbohydrate and nitrogen sources listed in Table XXX are presented in Table XXXI. These values, obtained by micro-Kjeldahl analysis of bacteria isolated from incubation mixtures, were positively correlated with the values for bacterial cell mass synthesis obtained above. The correlation coefficient (r) between absorbance (Table XXIX) and bacterial protein (Table XXXI) data was 0.98. The in vitro dry matter digestibility of the four carbohydrates in Table XXVI was also positively correlated with the ability of these carbohydrates to increase microbial cell mass (as measured spectrophotometrically) during in vitro incubations of the carbohydrates with rumen fluid (r=0.91). The digestibility was correlated with the ability of the carbohydrates to increase bacterial protein synthesis (as measured by micro-Kjeldahl) during in vitro incubations (r=0.89). These data suggest that the more digestible treated stover fractions are also the better sources of carbohydrate and nitrogen for bacterial protein synthesis, when these treated stover fractions provide the majority of carbohydrate and nitrogen in in vitro rumen fluid incubation mixtures. Tables XXIX and XXXI also show that controls containing no added carbohydrate (other than carbohydrate in rumen fluid) had very low values for bacterial cell mass and protein synthesis.

TABLE XXXI

ESTIMATES OF THE QUANTITY OF PROTEIN SYNTHESIZED BY RUMEN BACTERIA INCUBATED IN VITRO WITH TREATED CORN STOVER IN THE ABSENCE OF GLUCOSE

| Added Substrate Incubated | Protein Nitrogen (mg/tube)[a] |
| --- | --- |
| No Carbohydrate or Urea | −0.018 ± 0.005 |
| Urea but No Carbohydrate | 0.016 ± 0.003[b] |
| Corn Stover Plus Urea | 0.592 ± 0.029[e] |
| Chlorinated Corn Stover Plus Urea | 0.182 ± 0.019[c] |
| Ammoniated Corn Stover Plus Urea | 0.649 ± 0.052[f] |
| Chlorinated, Ammoniated Corn Stover Plus Urea | 0.339 ± 0.005[d] |

[a]Minus protein nitrogen in blank.
[b,c,d,e,f]Mean values that do not have a common letter in the superscript are different (P < 0.05). Mean and sample standard deviation of triplicate determinations.

Additional incubations similar to those just described were conducted to determine the effect of a given untreated or treated stover fraction on the prodiction of bacterial cell mass or crude protein, in the presence of excess carbohydrate. Incubations and analyses were conducted identically to those just described, with the exception that excess glucose was added to each incubation mixture, to insure that adequate energy would be present for microbial protein synthesis. Since excess carbohydrate was present in each incubation tube, protein synthesis data should reflect the ability of bacterial to use the nitrogen present in each tube.

Aqueous suspensions of bacteria isolated from 48 hour incubations of various untreated and treated corn stover fractions plus rumen fluid, in the presence of excess glucose, were measured spectrophotometrically to assess bacterial cell mass synthesis during these incubations. The absorbance values of these suspensions are given in Table XXXII. The data shown in this table reveal that bacterial cell mass synthesis was increased when ammoniated stover-urea or chlorinated, ammoniated stover were used as substrates for cell mass synthesis. Bacterial protein synthesis data, determined by the micro-Kjeldahl analysis of the bacterial suspensions, are presented in Table XXXIII. There was a positive correlation between the spectrophotometric and the micro-Kjeldahl data, with a correlation coefficient of 0.98. Levels of bacterial protein synthesis using chlorinated, ammoniated stover substrate were significantly increased over levels synthesized using corn stover and urea substrate, whenever excess glucose was present in the incubation mixtures. This increase with chlorinated, ammoniated stover was not seen when excess glucose was absent from the incubation mixture, indicating that bacteria in the rumen fluid could use the nitrogen of chlorinated, ammoniated corn stover for protein synthesis more effectively than they could use the carbohydrate portion of the treated stover. In addition, the data indicate that the nitrogen of chlorinated, ammoniated stover was used more efficiently than the nitrogen of a stover-urea mixture for protein synthesis by rumen bacteria in in vitro incubations carried out with excess glucose present in the incubation mixture. Control incubation tubes containing added glucose but no added nitrogen other than that in the rumen fluid again showed very low values for bacterial protein synthesis (Tables XXXII and XXXIII). These control protein synthesis values were, in fact, negative, as were values for controls in the earlier study where no excess glucose was added to the incubation mixtures. These negative values for bacterial protein synthesis occurred because microbial crude protein values after 48 hours of incubation were lower than crude protein values observed before incubation. The reason for this decrease in bacterial crude protein in the incubation mixtures of control flasks containing added carbohydrate but no added nitrogen is not known. Perhaps the control incubation mixtures became depleted in nitrogen during incubation, resulting in cell death, lysis and decreased bacterial cell mass.

TABLE XXXII
ABSORBANCES OF AQUEOUS BACTERIAL SUSPENSIONS RESULTING FROM IN VITRO INCUBATIONS OF TREATED CORN STOVER WITH RUMEN FLUID IN THE PRESENCE OF GLUCOSE

| Added Substrate Incubated | Absorbance[a] |
|---|---|
| Glucose | −0.0820 (−0.0805, −0.0835) |
| Glucose and Urea | 1.4675 (1.4160, 1.5190) |
| Corn Stover, Glucose and Urea | 1.0090 (1.0010, 1.0170) |
| Chlorinated Corn Stover, Glucose and Urea | 1.0495 (1.0495, 1.0495) |
| Ammoniated Corn Stover, Glucose and Urea | 2.7805 (2.7805, 2.7805) |
| Chlorinated, Ammoniated Corn Stover, Glucose and Urea | 2.3145 (2.2515, 2.3775) |

[a]Minus absorbance of blank. Mean and individual values (in parentheses) of duplicate determinations.

TABLE XXXIII
ESTIMATES OF THE QUANTITY OF PROTEIN SYNTHESIZED BY RUMEN BACTERIA INCUBATED IN VITRO WITH TREATED CORN STOVER IN THE PRESENCE OF GLUCOSE

| Added Substrate Incubated | Protein Nitrogen (mg/tube)[a] |
|---|---|
| Glucose | −0.021 (−0.016, −0.025) |
| Glucose and Urea | 1.251 (1.194, 1.307) |
| Corn Stover, Glucose and Urea | 1.180 (1.174, 1.186) |
| Chlorinated Corn Stover, Glucose and Urea | 0.608 (0.608, 0.608) |
| Ammoniated Corn Stover, Glucose and Urea | 2.322 (2.284, 2.360) |
| Chlorinated, Ammoniated Corn Stover, Glucose and Urea | 1.470 (1.405, 1.535) |

[a]Minus protein nitrogen in blank. Mean and individual values (in parentheses) of duplicate determinations.

As noted in Tables XXXIX through XXXIII micro-Kjeldahl protein synthesis data for chlorinated stover is comparatively lower than spectrophotometric protein synthesis data. The bacterial pellet resulting from incubations using chlorinated corn stover had a darker color than pellets resulting from incubations using other carbohydrates. This darker color may have caused the absorbance at 650 nm to be high compared to the nitrogen content of the pellet. The micro-Kjeldahl data might thus give a more accurate assessment than the spectrophotometric data of the amount of microbial protein synthesized by rumen bacteria during in vitro incubations with the various treated stover fractions.

7. In Vitro Rumen Ammonia Release from Treated Corn Stover and Wheat Straw

The free $NH_3$ levels in incubation mixtures containing the carbohydrate and nitrogen sources listed in Table IV are presented in Table XXXIV. The purpose of this first study was to determine if chlorinated, ammoniated corn stover released less $NH_3$ into an in vitro rumen fluid incubation mixture than did an isonitrogenous amount of untreated corn stover and $NH_4HCO_3$. These data indicate that less $NH_3$ was released into the incubation mixtures containing chlorinated, ammoniated corn stover than into stover-$NH_4HCO_3$ incubation mixtures at all times during the incubation period. These in vitro results thus indicate that chlorinated, ammoniated corn stover would be less likely to cause $NH_3$ toxicity problems in ruminants, than would an isonitrogenous amount of corn stover and an easily hydrolyzed nonprotein nitrogen source, such as $NH_4HCO_3$. The amount of $NH_3$ released into incubation mixtures by chlorinated, ammoniated corn stover was also lower than the amount released by chlorinated stover-$NH_4HCO_3$ or ammoniated stover-$NH_4HCO_3$ during the first eight hours of incubation.

TABLE XXXIV
COMPARISON OF FREE AMMONIA LEVELS (MG PER 100 ML) IN IN VITRO INCUBATION MIXTURES CONTAINING STOVER-$NH_4HCO_3$ COMBINATIONS TO THOSE IN MIXTURES CONTAINING CHLORINATED, AMMONIATED STOVER[a]

| See Table IV | Time (hr) | | | |
|---|---|---|---|---|
| | 0 | 2 | 4 | 6 |
| Flask 1 | 44.80(44.09,45.50) | 37.87(37.06,38.68) | 31.15(30.96,31.34) | 31.15(31.14,31.15) |
| Flask 2 | 36.90(36.74,37.06) | 38.02(38.02,38.02) | 36.58(36.34,36.81) | 38.75(38.61,38.89) |
| Flask 3 | 34.69(34.53,34.85) | 39.16(39.00,39.32) | 36.67(36.53,36.81) | 38.89(38.89,38.89) |
| Flask 4 | 34.06(33.91,34.21) | 35.63(35.15,36.10) | 33.89(33.89,33.89) | 36.20(36.06,36.34) |
| Flask 5 | 30.13(29.98,30.28) | 31.62(31.46,31.77) | 31.62(31.62,31.62) | 32.85(32.28,33.41) |
| Flask 6 | 30.42(29.68,31.16) | 33.75(33.29,34.21) | 25.36(25.07,25.64) | 20.36(19.60,21.11) |

| See Table IV | Time (hr) | | |
|---|---|---|---|
| | 8 | 14 | 24 |
| Flask 1 | 28.04(27.85,28.22) | 30.30(30.30,30.30) | 29.69(29.26,30.11) |
| Flask 2 | 38.32(38.32,38.32) | 38.09(37.29,38.89) | 38.47(37.85,39.08) |
| Flask 3 | 35.97(35.59,36.34) | 30.92(30.68,31.15) | 31.62(32.09,31.15) |
| Flask 4 | 35.11(35.11,35.11) | 31.06(30.96,31.15) | 33.56(33.23,33.89) |
| Flask 5 | 31.06(30.96,31.15) | 30.21(30.11,30.30) | 28.32(27.85,28.79) |
| Flask 6 | 21.29(20.94,31.63) | 21.03(20.94,21.11) | 18.78(18.78,18.94) |

[a]Mean and individual values (in parentheses) of duplicate determinations.

The presence of excess glucose in one incubation mixture greatly stimulated the uptake of $NH_3$ by bacteria in the flask. These results are consistent with results of in vitro microbial protein synthesis studies discussed above. Microbial protein synthesis was greater in these earlier studies when glucose was included in the incubation mixtures. In the present study, bacteria were apparently using more of the $NH_3$ present to synthesize larger amounts of microbial protein, when glucose was included in the incubation flasks.

Free $NH_3$ levels resulting from incubating chlorinated, ammoniated corn stover in rumen fluid were next compared to the levels seen when an isonitrogenous amount of urea and corn stover were incubated with the same rumen fluid. Rumen bacteria must hydrolyze urea to $NH_3$, and this $NH_3$ is then used for protein synthesis, as described earlier. A period of time must thus pass before peak $NH_3$ levels are seen in incubation mixtures containing urea. The carbohydrate and nitrogen composition of incubation mixtures used in this study is presented in Table VI. The free $NH_3$ levels resulting from incubation of these carbohydrate and nitrogen sources with rumen fluid are given in Table XXXV. The highest free $NH_3$ levels were initially observed in flasks containing chlorinated, ammoniated corn stover as the primary nitrogen sources. The free $NH_3$ levels in these flasks remained relatively constant throughout the incubation period, however, while free $NH_3$ levels in flasks containing urea gradually rose during incubation, and plateaued at about 14 hours after the start of incubation. Free $NH_3$ levels in the stover-urea mixture were higher ($P<0.05$) than levels in the chlorinated, ammoniated stover mixture at all times between 4 and 24 hours after the start of incubation. Once again, the bacteria of an incubation mixture containing starch as an energy source in addition to chlorinated, ammoniated stover took up more $NH_3$ from the incubation mixture than did bacteria relying on chlorinated, ammoniated stover alone as the energy source.

sugars, and for amino acid biosynthesis from slowly fermented polysaccharides, such as cellulose.

In another study similar to the two just discussed, the free $NH_3$ levels present in incubation mixtures containing chlorinated, ammoniated wheat straw were compared to those found in isonitrogenous incubation mixtures containing untreated wheat straw and $NH_4HCO_3$. The amounts of carbohydrate and nitrogen added to each flask used for incubation are presented in Table VII. Table XXXVI gives the free $NH_3$ levels of each incubation mixture as a function of incubation time. The results of this study, like those of the two previous studies, indicate that the chlorinated, ammoniated plant material generally gave lower levels of free $NH_3$ during incubation of the material in rumen fluid, when compared to the levels resulting from incubation of an isonitrogenous amount of untreated straw and $NH_4HCO_3$.

TABLE XXXVI

COMPARISON OF FREE AMMONIA LEVELS (MG PER 100 ML) IN IN VITRO INCUBATION MIXTURES CONTAINING STRAW-$NH_4HCO_3$ COMBINATIONS TO THOSE IN MIXTURES CONTAINING CHLORINATED, AMMONIATED STRAW[a]

| Time (hr) (See Table VII) | Flask 1 | Flask 2 | Flask 3 | Flask 4 | Flask 5 |
|---|---|---|---|---|---|
| 0 | 46.77 (46.59, 46.94) | 42.00 (42.00, 42.00) | 43.39 (43.04, 43.73) | 40.65 (40.65, 40.65) | 36.27 (35.47, 37.06) |
| 1 | 43.92 (43.39, 44.45) | 43.58 (42.70, 44.45) | 41.33 (40.99, 41.67) | 39.66 (39.66, 39.66) | 38.34 (38.34, 38.34) |
| 2 | 42.76 (42.76, 42.76) | 43.05 (42.76, 43.33) | 40.92 (40.78, 41.06) | 39.93 (39.64, 40.21) | 36.58 (36.35, 36.81) |
| 4 | 36.15 (35.30, 37.00) | 41.91 (41.63, 42.19) | 42.33 (41.63, 43.04) | 41.20 (41.06, 41.34) | 36.67 (36.34, 37.00 |
| 6 | 35.59 (35.59, 35.59) | 43.75 (43.51, 43.89) | 40.49 (40.49, 40.49) | 39.50 (39.36, 39.64) | 36.67 (36.53, 36.81) |
| 8 | 28.84 (28.60, 29.07) | 38.47 (38.32, 38.61) | 36.30 (36.06, 36.53) | 33.42 (32.47, 34.36) | 30.21 (29.92, 30.49) |
| 14 | 32.47 (32.47, 32.47) | 41.49 (39.93, 43.04) | 34.79 (33.70, 35.87) | 38.99 (38.89, 39.08) | 34.83 (34.83, 34.83) |
| 24 | 25.83 (25.64, 26.01) | 37.57 (37.57, 37.57) | 33.89 (33.41, 34.36) | 30.54 (29.45, 31.62) | 27.81 (27.20, 28.41) |

[a]Mean and individual values (in parentheses) of duplicate determinations.

In summary, the studies reported in this section show that chlorinated, ammoniated corn stover or wheat straw released $NH_3$ more slowly into incubation mixtures contining rumen fluid, when compared to isonitrogenous amounts of untreated corn stover or wheat straw plus $NH_4HCO_3$. Incubation flasks containing urea

TABLE XXXV

COMPARISON OF FREE AMMONIA LEVELS (MG PER 100 ML) IN IN VITRO INCUBATION MIXTURES CONTAINING STOVER-UREA COMBINATIONS TO THOSE IN MIXTURES CONTAINING CHLORINATED, AMMONIATED STOVER

| See Table VI | Time (hr) | | | | | | | |
|---|---|---|---|---|---|---|---|---|
| | 0 | 1 | 2 | 4 | 6 | 8 | 14 | 24 |
| Flask 1 | 15.83 ± 0.69[d] | 42.12 ± 1.19[e] | 50.53 ± 0.47[3] | 67.10 ± 1.14[f] | 64.44 ± 0[d] | 55.97 ± 1.96[c] | 58.06 ± 1.37[c] | 64.21 ± 1.29[c] |
| Flask 2 | 5.40 ± 0.50[a] | 5.46 ± 0.28[a] | 3.31 ± 0.48[a] | 1.03 ± 0.74[a] | 0.57 ± 0.23[a] | 0.49 ± 0.45[a] | 0.83 ± 0.56[a] | 0.27 ± 0.23[a] |
| Flask 3 | 9.47 ± 0.16[c] | 34.53 ± 0[c] | 41.67 ± 2.29[c] | 59.47 ± 1.34[d] | 70.78 ± 3.15[e] | 80.69 ± 2.51[f] | 85.63 ± 3.55[f] | 86.21 ± 2.29[f] |
| Flask 4 | 7.73 ± 0.27[b] | 17.39 ± 1.09[b] | 23.22 ± 0.67[b] | 37.62 ± 1.11[b] | 47.91 ± 1.71[b] | 55.69 ± 0.54[c] | 78.78 ± 2.85[e] | 81.66 ± 2.83[e] |
| Flask 5 | 15.16 ± 0.35[d] | 36.58 ± 0.83[d] | 48.24 ± 0.79[d] | 62.12 ± 0.63[e] | 65.62 ± 2.93[d] | 71.14 ± 1.47[e] | 74.72 ± 1.50[d] | 68.52 ± 2.60[d] |
| Flask 6 | 57.50 ± 2.17[e] | 55.75 ± 1.15[f] | 61.16 ± 1.81[g] | 55.85 ± 0.75[c] | 63.07 ± 0.99[d] | 64.02 ± 2.79[d] | 59.91 ± 1.09[c] | 61.05 ± 1.86[c] |
| Flask 7 | 69.37 ± 0.64[f] | 60.29 ± 0.59[g] | 55.75 ± 1.35[f] | 58.16 ± 1.38[d] | 58.06 ± 1.69[c] | 49.39 ± 0.95[b] | 31.14 ± 1.64[b] | 23.99 ± 0.68[b] |

[a, b, c, d, e, f, g]Mean values within each column that do not have a common letter in the superscript are different ($P<0.05$). Mean and sample standard deviation of triplicate determinations.

The results of this study indicate that chlorinated, ammoniated corn stover released $NH_3$ more steadily into rumen fluid than did urea. Although $NH_3$ levels were initially higher in incubation mixtures containing stover treated with $Cl_2$ and $NH_3$, the $NH_3$ levels in flasks containing urea gradually increased until they exceeded the levels in flasks containing chlorinated, ammoniated corn stover. This steady release of $NH_3$ from nonprotein nitrogen is desirable, because it allows $NH_3$ to remain in the rumen at constant, intermediate levels for long periods. Ammonia would thus be available for amino acid biosynthesis from carbohydrates that are fermented quickly in the rumen, such as simple initially had very low levels of free $NH_3$ when compared to the levels found in flasks containing chlorinated, ammoniated stover. After several hours of incubation, however, $NH_3$ levels were higher in urea-containing flasks than in flasks containing the treated corn stover. These results indicate that chlorinated, ammoniated plant materials should be more valuable from a ruminant $NH_3$ toxicity standpoint, than their untreated counterparts containing added $NH_4HCO_3$. These in vitro data also indicate that chlorinated, ammoniated plant materials should be less toxic than urea after several hours of fermentation in the rumen.

8. Guinea Pig Feeding Trials

The weight gains in grams per day of Guinea pigs fed various corn stover based diets, at the end of four week feeding trials, are presented in Table XXXVII. Two groups of Guinea pigs consuming a diet containing corn stover or treated corn stover had weight gains that were different at the five percent significance level from the weight gains of the control group consuming the basal diet (7960; see Table VIII) containing no added stover or treated stover. Animals consuming the basal diet containing 2.5 percent added hypochlorite-treated stover gained less than animals consuming the basal diet alone. Addition of five percent untreated corn stover to the basal diet, on the other hand, stimulated weight gains in Guinea pigs during the four week trial. The only stover fraction that appeared to stimulate growth in the Guinea pig was corn stover added at the five percent level to the Guinea pig basal diet. The reason for this stimulation is not known. Perhaps the corn stover was supplying some essential nutrient not present in the basal diet in these feeding trials.

TABLE XXXVII

AVERAGE DAILY GAINS OF GUINEA PIGS FED UNTREATED AND HYPOCHLORITE-TREATED STOVER AND WHOLE CORN PLANT

| Feeding Period | Diet | Average Daily Gain (grams per day) |
|---|---|---|
| 1 | Basal | 7.19 ± 0.79[b] |
|   | Basal Plus 2.5% Stover | 6.57 ± 0.65[b] |
| 2 | Basal | 7.20 ± 0.62[c] |
|   | Basal Plus 2.5% Hypochlorite-treated Stover | 6.53 ± 0.47[b] |
| 3 | Basal | 7.15 ± 0.91[b] |
|   | Basal Plus 2.5% Whole Corn Plant | 7.14 ± 0.93[b] |
| 4 | Basal | 7.01 ± 1.25[b] |
|   | Basal Plus 2.5% Hypochlorite-treated Whole Corn Plant | 6.39 ± 0.86[b] |
| 5 | Basal | 6.36 ± 0.84[b] |
|   | Basal Plus 5.0% Stover | 7.56 ± 0.80[c] |
| 6 | Basal | 7.21 ± 0.87[b] |
|   | Basal Plus 5.0% Hypochlorite-treated Stover | 7.36 ± 1.35[b] |
| 7 | Basal | 6.83 ± 1.13[b] |
|   | Basal Plus 5.0% Whole Corn Plant | 7.39 ± 1.07[b] |
| 8 | Basal | 6.36 ± 0.84[b] |
|   | Basal Plus 5.0% Hypochlorite-treated Whole Corn Plant | 7.36 ± 1.14[b] |

[a] Each feeding period lasted for four weeks.
[b, c] Mean values within each feeding period that do not have a common letter in the superscript are different (P < 0.05). Each diet was fed to a group of eight animals. Values listed are the mean and standard deviation.

The blood $NH_3$ concentration of Guinea pigs fed untreated or hypochlorite-treated corn stover or whole corn plant is depicted in Table XXXVIII. Guinea pigs fed the basal diet substituted with 2.5 percent hypochlorite-treated corn stover had lower blood $NH_3$ levels than those consuming the basal diet (P<0.05). When 5.0 percent whole corn plant was added to Guinea pig basal diets, the blood $NH_3$ concentration of Guinea pigs consuming the diets was also significantly decreased. The results of this study demonstrate that the addition of corn stover or whole corn plant, whether hypochlorite-treated or untreated, to the basal diet of Guinea pigs generally caused the blood $NH_3$ concentration to decrease. This decrease was significant at the five percent level in two instances, and approached significance at this level in one other instance.

TABLE XXXVIII

BLOOD AMMONIA CONCENTRATIONS OF GUINEA PIGS FED UNTREATED AND HYPOCHLORITE-TREATED STOVER AND WHOLE CORN PLANT

| Feeding Period | Diet | Blood Ammonia Concentration (mg per 100 ml) |
|---|---|---|
| 1 | Basal | 0.1728 ± 0.0604[b] |
|   | Basal Plus 2.5% Stover | 0.1504 ± 0.490[b] |
| 2 | Basal | 0.3276 ± 0.2278[c] |
|   | Basal Plus 2.5% Hypochlorite-treated Stover | 0.1719 ± 0.0733[b] |
| 3 | Basal | 0.1889 ± 0.0745[b] |
|   | Basal Plus 2.5% Whole Corn Plant | 0.2609 ± 0.1335[b] |
| 4 | Basal | 0.2367 ± 0.0871[b] |
|   | Basal Plus 2.5% Hypochlorite-treated Whole Corn Plant | 0.1515 ± 0.0613[b] |
| 5 | Basal | 0.2357 ± 0.0811[b] |
|   | Basal Plus 5.0% Stover | 0.1908 ± 0.0644[b] |
| 6 | Basal | 0.1952 ± 0.0275[b] |
|   | Basal Plus 5.0% Hypochlorite-treated Stover | 0.2674 ± 0.1242[b] |
| 7 | Basal | 0.1998 ± 0.0673[c] |
|   | Basal Plus 5.0% Whole Corn Plant | 0.1176 ± 0.0241[b] |
| 8 | Basal | 0.2264 ± 0.0633[b] |
|   | Basal Plus 5.0% Hypochlorite-treated Whole Corn Plant | 0.2130 ± 0.840[b] |

[a] Each feeding period lasted for four weeks.
[b, c] Mean values within each feeding period that do not have a common letter in the superscript are different (P < 0.05). Each diet was fed to a group of eight animals. Values listed are the mean and standard deviation.

Nonruminant animals including the Guinea pig would not be expected to extensively use the nitrogen of chlorinated, ammoniated corn stover for protein synthesis. This is because they lack the extensive microflora necessary for protein synthesis from $NH_3$ that is found in the rumen. Chlorinated, ammoniated stover might, however, be toxic to nonruminants because of the excess free $NH_3$ that the product contains, or because of the possible presence of other toxic metabolites such as imidazoles in the treated corn stover. Chlorinated, ammoniated corn stover was fed to Guinea pigs at comparatively high levels to investigate this possible toxicity. The weight gains of Guinea pigs consuming chlorinated, ammoniated corn stover substituted at several levels for the whole basal diet are shown in Table XXXIX. This treated stover, fed at 10.0 percent of the diet or less, had no significant effect on the rate of gain of Guinea pigs, when Guinea pigs consuming the treated stover were compared to those consuming the basal diet alone. When chlorinated, ammoniated stover was fed at the 20.0 percent level, however, Guinea pig weight gains were depressed (P<0.05). Since feed refusals were not measured in this study, it is not known if decreased weight gains were a result of toxicity of the product, or of decreased consumption of diets containing high levels of the product by Guinea pigs. It was noted (data not presented) that average daily gains of Guinea pigs consuming diets containing 20.0 percent chlorinated, ammoniated corn stover increased sharply as the feeding trials progressed, so perhaps the animals were adapting to the high $NH_3$ diet during early parts of the feeding trial.

TABLE XXXIX

AVERAGE DAILY GAINS OF GUINEA PIGS FED UNTREATED AND CHLORINATED, AMMONIATED CORN STOVER[a]

| Feeding Period | Diet | Average Daily Gain (grams per day) |
|---|---|---|
| 1 | Basal | 8.11 ± 0.93[b] |
|   | Basal Plus 2.5% Chlorinated, Ammoniated Stover | 7.80 ± 1.51[b] |
|   | Basal Plus 5.0% Chlorinated, Ammoniated Stover | 8.29 ± 1.15[b] |
| 2 | Basal | 7.41 ± 0.24[b] |
|   | Basal Plus 10.0% Chlorinated, Ammoniated Stover | 7.87 ± 1.18[b] |
| 3 | Basal | 8.25 ± 0.86[c] |
|   | Basal Plus 20.0% Chlorinated, Ammoniated Stover | 5.91 ± 1.52[b] |

[a] Each feeding period lasted for four weeks. Each diet was fed to a group of four animals.
[b, c] Mean values within each feeding period that do not have a common letter in the superscript are different (P < 0.05). Values listed are the mean and standard deviation.

The blood $NH_3$ content of Guinea pigs fed a basal diet, and a basal diet substituted with several levels of chlorinated, ammoniated corn stover is presented in Table XL. Blood $NH_3$ levels were in all instances higher when chlorinated, ammoniated corn stover was included in the diet, than when no treated stover was added. These differences were never significant, however, because of the small number of animals used in this study. Only four control and four experimental animals were used, and there were large variations among Guinea pigs in blood $NH_3$ levels. Studies with more animals in a group might have revealed differences in blood $NH_3$ resulting from the various diets fed.

TABLE XL

BLOOD AMMONIA CONCENTRATIONS OF GUINEA PIGS FED UNTREATED AND CHLORINATED, AMMONIATED CORN STOVER[a]

| Feeding Period | Diet | Blood Ammonia Concentration (mg per 100 ml)[b] |
|---|---|---|
| 1 | Basal | 0.2204 ± 0.0988 |
|   | Basal Plus 2.5% Chlorinated, Ammoniated Stover | 0.3326 ± 0.1047 |
|   | Basal Plus 5.0% Chlorinated, Ammoniated Stover | 0.2564 ± 0.0388 |
| 2 | Basal | 0.2754 ± 0.0594 |
|   | Basal Plus 10.0% Chlorinated, Ammoniated Stover | 0.3019 ± 0.0950 |
| 3 | Basal | 0.2569 ± 0.0246 |
|   | Basal Plus 20.0% Chlorinated, Ammoniated Stover | 0.2658 ± 0.0592 |

[a] Each feeding period lasted for four weeks. Each diet was fed to a group of four animals.
[b] No significant differences in blood ammonia levels were detected between control and experimental animals. Values listed are the mean and standard deviation.

The percentage of crude protein in the chlorinated, ammoniated corn stover used in these Guinea pig feeding trials was 32.25±0.07 percent. The basal diet (7960; see Table VIII) contained 27.54±1.47 percent crude protein, while the basal diet substituted at the 5.0 percent level with chlorinated, ammoniated corn stover contained 27.88±1.10 percent crude protein. The basal diet contained no detectable free $NH_3$ as determined by MgO distillation. The basal diet substituted with 10.0 percent chlorinated, ammoniated corn stover contained 0.40±0 percent free $NH_3$ nitrogen, while the basal diet substituted with 20.0 percent chlorinated, ammoniated stover contained 0.74±0.01 percent free $NH_3$ nitrogen.

9. Sheep Feeding Trials

The dry matter and crude protein content of untreated and chlorinated, ammoniated corn stover used for sheep feeding trials is presented in Table XLI. This table also gives the dry matter and crude protein content of urea adaptation, low stover and high stover diets used for these $NH_3$ toxicity studies. The control and experimental diets were approximately isonitrogenous.

TABLE XLI

DRY MATTER AND CRUDE PROTEIN CONTENT OF SHEEP DIETS AND STOVER USED IN SHEEP DIETS

| Diet or Dietary Component | Dry Matter (%) | Crude Protein (%)[a] |
|---|---|---|
| Untreated Stover | 89.9 | 7.32 ± 0.55 |
| Chlorinated, Ammoniated Stover | 91.0 | 45.76 ± 1.57 |
| Urea Adaptation Diet (Table XIII) | 86.8 | 17.94 ± 0.35 |
| High Stover Control (Table XIV) | 88.5 | 17.65 ± 0.48 |
| High Stover Experimental (Table XIV) | 89.3 | 16.64 ± 0.59 |
| Low Stover Control (Table XV) | 88.8 | 14.62 ± 0.51 |
| Low Stover Experimental (Table XV) | 88.8 | 15.96 ± 1.15 |

[a] Values are expressed on a dry matter basis. Values listed are the mean and sample standard deviation of triplicate determinations.

The sheep consumed the urea adaptation diet (Table XIII) well throughout the entire adaptation period. When the animals were placed on the control and experimental high stover diets (Table XIV) their feed consumption decreased. Consumption of the experimental diet of Table XIV was poorer than consumption of the control diet. The experimental diet was consumed poorly by all three sheep assigned to this diet during the first several days of adaptation. Consumption then increased until the last three to five days of the $NH_3$ toxicity studies, when it again decreased. Two of the three experimental animals were consuming the diets of Table XIV very poorly after two weeks, while the third sheep in this group consumed the experimental diet well throughout the entire adaptation and sampling period.

When the diets of control and experimental sheep were switched, and the stover content of the diets was lowered (that is, when the sheep were fed the diets of Table XV), the consumption of the diets by control and experimental groups was similar. Since consumption of experimental diets increased when the level of treated stover included in the diets was lowered, it appears that sheep disliked the taste or odor of chlorinated, ammoniated stover. The odor of the experimental diets offered to the sheep was not unpleasant. The poor consumption by sheep of the diet containing high levels of chlorinated, ammoniated stover (experimental diet of Table XIV) contrasted sharply with the apparent good acceptability of similar dietary levels of the treated stover by Guinea pigs (see Table XXIX). Water was added to the Guinea pig diets before feeding, whereas the sheep diets were fed dry. The dry treated stover may have irritated the mouth of sheep consuming the experimental diet, causing them to reject the diet. As mentioned earlier, however, one of the three sheep consuming the diet containing the higher level of chlorinated, ammoniated stover (Table XIV) ate the diet well throughout the entire feeding trial. The other two sheep consuming this experimental diet may have been more selective in their eating habits.

One sheep consuming the experimental diet of Table XIV became lethargic during the feeding period, and feed consumption dropped severely at the end of this period. When this animal was switched to the control diet of Table XIV, consumption again remained at a low level. For this reason, rumen and blood sample data for this animal during the period when the diet of Table XV was fed are not presented. Clumps of wool, which were found in rumen fluid samples taken from this sheep, may have been the cause of his extremely poor feed intake during consumption of both experimental and control diets. The weights of sheep at various stages of the feeding trial are presented in Table XLII. Weight losses of some animals after consuming experimental diets reflect the fact that intake of these diets by the sheep was poor in some instances.

TABLE XLIII

RUMEN AMMONIA LEVELS (MG PER 100 ML) IN SHEEP FED HIGH STOVER CONTROL AND EXPERIMENTAL DIETS

| Animal No. | Nitrogen Consumed[a] | Times (hr) | | | | | | | |
|---|---|---|---|---|---|---|---|---|---|
| | | 0 | 0.5 | 1.0 | 1.5 | 2.0 | 2.5 | 3.0 | 4.0 |
| RC[b] | 0.066 | 20.47 ± 0.27[d] | 44.40 ± 0.60[e] | 45.30 ± 0.30[d] | 43.30 ± 0.35[d] | 33.37 ± 0.29[d] | 30.37 ± 0.12[d] | 27.71 ± 0.79[d] | 20.58 ± 0.30[d] |
| RD17[c] | 0.070 | 37.33 ± 0.90[e] | 43.40 ± 1.17[d] | 44.33 ± 2.71[d] | 46.4 ± 0.17[e] | 43.00 ± 0.92[e] | 40.33 ± 0.46[e] | 40.97 ± 0.70[e] | 35.93 ± 0.46[e] |
| 4811[b] | 0.052 | 24.73 ± 0.48[d] | 40.60 ± 1.10[e] | 34.93 ± 0.40[d] | 31.30 ± 0.56[d] | 29.03 ± 0.21[d] | 27.30 ± 0.42[d] | 28.05 ± 0.53[d] | 27.74 ± 1.74[d] |
| 4731[c] | 0.049 | 29.03 ± 0.21[e] | 32.57 ± 0.99[d] | 33.40 ± 0.72[d] | 31.00 ± 0.20[d] | 31.97 ± 0.80[e] | 30.77 ± 0.25[e] | 31.50 ± 0.36[d] | 32.30 ± 0.90[e] |
| E16[b] | 0.097 | 31.33 ± 2.49[e] | 41.83 ± 0.57[d] | 51.93 ± 0.95[d] | 47.73 ± 0.97[d] | 44.00 ± 0.46[d] | 42.70 ± 0.75[d] | 36.53 ± 0.29[d] | 32.27 ± 0.47[d] |
| MRX[c] | 0.101 | 21.82 ± 0.36[d] | 52.60 ± 1.04[e] | 75.90 ± 0.35[e] | 72.37 ± 0.46[e] | 63.83 ± 0.95[e] | 61.67 ± 0.29[e] | 58.90 ± [e] | 62.60 ± 0.98[e] |

[a] Grams of nitrogen consumed per kilogram of body weight per feeding period.
[b] Consumed the control diet of Table XIV.
[c] Consumed the experimental diet of Table XIV.
[d, e] Mean values that do not have a common letter in the superscript, within each pair consuming the same amount of nitrogen, are different (p < 0.05). Mean and sample standard deviation of triplicate determinations.

TABLE XLII

WEIGHTS (KG) OF SHEEP FED UREA ADAPTATION, HIGH STOVER AND LOW STOVER DIETS

| Sheep Number | After Urea Adaptation Diet[a] | After High Stover Diet[b] | After Low Stover Diet[c] |
|---|---|---|---|
| RD17 | 75.8 | 71.7[e] | 60.8[d] |
| RC | 63.1 | 63.6[d] | 63.6[e] |
| 4811 | 79.4 | 80.4[d] | 75.8[e,f] |
| 4731 | 75.8 | 72.6[e] | 74.0[d] |
| E16 | 79.4 | 78.1[d] | 77.2[e] |
| MRX | 92.6 | 88.1[e] | 90.8[d] |

[a] Described in Table XIII.
[b] Described in Table XIV.
[c] Described in Table XV.
[d] Consumed the control diet during this period.
[e] Consumed the experimental diet during this period.
[f] An accident during this period caused massive hemorrhage in this sheep.

The control and experimental sheep within each pair were fed the same amount of nitrogen per kg of body weight on the day that samples of blood and rumen fluid were taken during $NH_3$ toxicity studies.

Rumen $NH_3$ concentrations in sheep fed the control and experimental diets described in Table XIV are presented in Table XLIII. Rumen $NH_3$ levels peaked at times between zero and one hour after the diets were fed to the sheep. Rumen $NH_3$ levels were never above 80 mg per 100 ml, the level generally considered to be toxic (National Research Council, 1976). The data reveal that animals fed experimental diets had both the highest and the lowest rumen $NH_3$ concentrations at times less than one hour after feeding, when rumen $NH_3$ levels in control sheep were at their maximum. The rate of ruminal $NH_3$ production during the first hour after feeding was slower in sheep consuming chlorinated, ammoniated stover than in sheep consuming stover-urea mixture, for two of the three pairs consuming the high stover diets. This slower rate of $NH_3$ release in the rumen is desirable from an $NH_3$ toxicity standpoint.

Rumen $NH_3$ concentrations after feeding were much higher in a sheep consuming the experimental diet than in a sheep consuming the control diet, for one of the three pairs of animals used in this study. This sheep having the high level of rumen $NH_3$ also consumed the experimental diet much better than did the other two sheep assigned to the experimental diet, as mentioned earlier. This experimental sheep with high rumen $NH_3$ levels may thus have eaten his diet more quickly than did the control animal in this study, which should result in sharper increases in rumen $NH_3$ levels after feeding. No effort was made to control the rate of feed consumption by the sheep, once they were offered their feed. Although rapid consumption of the diet would explain why rumen $NH_3$ levels rose so quickly in the experimental animal with high rumen $NH_3$ levels, it would not explain why peak rumen $NH_3$ levels were higher in this animal than in the control sheep. The control and experimental sheep consumed approximately the same amount of nitrogen during the feeding period prior to sampling, so peak rumen $NH_3$ levels should reflect the relative value of the feeds as slow $NH_3$ release sources. Sheep consuming the experimental diet had lower levels of rumen $NH_3$ at times when rumen $NH_3$ levels had peaked in sheep consuming the control urea-based diet, for two of the three pairs studied. In addition, in two of three instances rumen $NH_3$ levels in animals consuming the experimental diet did not fluctuate as much during the sampling period as levels in animals consuming the control diet. The data for these two pairs indicate that chlorinated, ammoniated stover, when compared to untreated stover plus urea, was supplying $NH_3$ to rumen microorganisms at a slower, more constant rate. This slow, constant production of $NH_3$ is highly desirable, because it allows the ruminant to provide $NH_3$ to rumen microbes at a steady rate without danger of $NH_3$ toxicity in the whole animal. The experimental animal in the pair consuming the highest amount of nitrogen per kg of body weight had higher rumen $NH_3$ levels than the control sheep after feeding. This experimental animal may have developed a rumen microbial population, during the period of adaptation to the experimental diet, that very readily degraded the chlorinated, ammoniated stover to $NH_3$.

High levels of rumen $NH_3$ are not toxic to the ruminant if rumen pH is kept at a low enough level to prevent conversion of substantial amounts of $NH_4^+$ ion to $NH_3$. A rise in rumen pH, which frequently accompanies the feeding of high urea diets to ruminants, will cause the ratio of $NH_3$ to $NH_4^+$ in the rumen to increase. The $NH_3$ formed under these conditions is lipid soluble, while $NH_4^+$ is not. This $NH_3$ can cross the rumen wall, enter the blood stream, cause blood $NH_3$ concentrations to increase, and potentially lead to $NH_3$ toxicity. It is thus desirable to keep the rumen pH at a low level, if possible, when nonprotein nitrogen is fed.

Rumen pH values of sheep consuming the control and experimental high stover diets of Table XIV were initially higher in experimental animals than in controls, for two of the three pairs studied. The initial rumen pH was lower in the experimental animal of the pair consuming the largest amount of nitrogen per kg of body weight, when compared to the control. The latter experimental sheep also had the highest rumen $NH_3$ concentration after feeding. This drop in rumen pH, coupled with a large increase in the rumen $NH_3$ concentration after feeding the experimental diet, is unlike the situation observed when urea diets are fed to ruminants. As just mentioned, urea feeding usually causes both rumen $NH_3$ and rumen pH to rise. Rumen pH in all three experimental animals in this study dropped within two hours after feeding, whereas rumen pH in two of the three sheep fed the urea-based diet rose shortly after feeding.

These data indicate that the nitrogen of diets supplemented with chlorinated, ammoniated stover at about a 10 percent level was converted into $NH_3$ in the rumen of sheep. The amount converted to $NH_3$ was in one instance higher at all times after feeding than that amount converted by an animal consuming the control diet containing a stover-urea mixture. The decrease in rumen pH that was observed when diets containing chlorinated, ammoniated stover were fed was one indication that an active fermentation was taking place. This decrease should result in a greater retention of $NH_3$ in the rumen, because $NH_3$ is less able to cross the rumen wall and enter the blood stream at low pH. More $NH_3$ should thus be available to microorganisms for protein synthesis. In addition, this pH drop should help to prevent $NH_3$ toxicity in ruminants consuming the experimental diet.

Blood plasma $NH_3$ concentrations in the sheep used in this study are presented in Table XLIV. These data, coupled with the data of Tables XLIII and XIV, indicate that in most cases rumen pH was a more important determinant of blood plasma $NH_3$ concentrations than was the level of rumen $NH_3$. Rumen $NH_3$ levels in the experimental sheep consuming the highest level of nitrogen per kg of body weight were, for example, higher than levels found in the sheep consuming the control diet. Rumen pH values, however, were lower in the experimental sheep, and plasma $NH_3$ values were consequently lower in this animal than in the sheep consuming the control diet, at times between zero and two hours after feeding. In contrast, the experimental sheep having the lowest level of rumen $NH_3$ at all times after feeding had the highest concentrations of plasma $NH_3$ at times up to two hours after feeding. The comparatively high rumen pH in this sheep was probably responsible for his high plasma $NH_3$ concentrations.

TABLE XLIV

PLASMA AMMONIA LEVELS (MG PER 100 ML) IN SHEEP FED HIGH STOVER CONTROL AND EXPERIMENTAL DIETS

| | Animal Number | | | | | |
|---|---|---|---|---|---|---|
| | $RC^b$ | $RD17^c$ | $4811^b$ | $4731^c$ | $E16^b$ | $MRX^C$ |
| | Nitrogen Consumed$^a$ | | | | | |
| Time (hr) | 0.066 | 0.070 | 0.052 | 0.049 | 0.097 | 0.101 |
| 0 | $0.373 \pm 0.010^e$ | $0.331 \pm 0.013^d$ | $0.466 \pm 0.010^d$ | $0.472 \pm 0.008^d$ | $0.524 \pm 0.023^d$ | $0.536 \pm 0.004^d$ |
| 0.5 | $0.423 \pm 0.024^d$ | $0.388 \pm 0.007^d$ | $0.477 \pm 0.024^d$ | $0.573 \pm 0.029^e$ | $0.445 \pm 0.031^d$ | $0.484 \pm 0.022^d$ |
| 1.0 | $0.395 \pm 0.012^e$ | $0.368 \pm 0.011^d$ | $0.452 \pm 0.024^d$ | $0.561 \pm 0.023^e$ | $0.527 \pm 0^e$ | $0.480 \pm 0.021^d$ |
| 1.5 | $0.357 \pm 0.017^d$ | $0.340 \pm 0.010^d$ | $0.578 \pm 0.048^e$ | $0.466 \pm 0.010^d$ | $0.476 \pm 0.014^e$ | $0.445 \pm 0.015^d$ |
| 2.0 | $0.362 \pm 0^d$ | $0.377 \pm 0.013^e$ | $0.457 \pm 0.007^d$ | $0.459 \pm 0.003^d$ | $0.429 \pm 0.031^d$ | $0.429 \pm 0.030^d$ |
| 2.5 | $0.482 \pm 0.004^e$ | $0.425 \pm 0.024^d$ | $0.436 \pm 0.018^e$ | $0.393 \pm 0.017^d$ | $0.390 \pm 0.011^d$ | $0.390 \pm 0.022^d$ |
| 3.0 | $0.434 \pm 0.041^d$ | $0.431 \pm 0.008^d$ | $0.404 \pm 0.016^d$ | $0.456 \pm 0.025^e$ | $0.384 \pm 0.017^d$ | $0.391 \pm 0.020^d$ |
| 4.0 | $0.469 \pm 0.016^e$ | $0.432 \pm 0.007^d$ | $0.512 \pm 0^e$ | $0.458 \pm 0.020^d$ | $0.399 \pm 0.017^d$ | $0.422 \pm 0.018^d$ |
| 5.0 | $0.454 \pm 0.021^d$ | $0.464 \pm 0.020^d$ | $0.483 \pm 0.026^d$ | $0.470 \pm 0.018^d$ | $0.406 \pm 0.026^d$ | $0.477 \pm 0.028^d$ |
| 6.0 | $0.448 \pm 0.017^e$ | $0.418 \pm 0.012^d$ | $0.449 \pm 0.024^d$ | $0.415 \pm 0.031^d$ | $0.377 \pm 0.024^d$ | $0.398 \pm 0.051^d$ |

$^a$Grams of nitrogen consumed per kilogram of body weight per feeding period.
$^b$Consumed the control diet of Table XIV.
$^c$Consumed the experimental diet of Table XIV.
$^{d, e}$Mean values that do not have a common letter in the superscript, within each pair consuming the same amount of nitrogen, are different ($P < 0.05$). Mean and sample standard deviation of triplicate determinations.

Nonprotein nitrogen sources that release $NH_3$ more slowly in the rumen than traditional sources such as urea are fed to ruminants for the ultimate purpose of reducing plasma $NH_3$ concentrations in these animals, and thereby averting $NH_3$ toxicity. Experimental animals in two of the three pairs had lower peak plasma $NH_3$ levels after feeding than did the control sheep. Experimental animals in these two pairs also had lower plasma $NH_3$ concentrations than controls during the first 1.5 hours after feeding. Two of the three experimental animals fed diets containing approximately 10 percent chlorinated, ammoniated stover should thus be less prone to $NH_3$ toxicity at early times after feeding than their corresponding controls fed diets containing approximately 10 percent of a stover-urea mixture. The highest concentration of plasma $NH_3$ observed in the present study (approximately 0.6 mg of $NH_3$ per 100 ml) was considerably lower than the 2.6 mg per 100 ml concentration that was observed by Crickenberger et al. (1977) J. Anim. Sci., 45:466 to cause acute $NH_3$ toxicity in steers. High levels of plasma $NH_3$ were not expected in the present study, because the level of nonprotein nitrogen fed to the sheep was one generally considered to be nontoxic. Nonprotein nitrogen composed approximately one-third of the total nitrogen in these diets.

Plasma urea nitrogen levels in sheep fed the diets described in Table XIX are shown in Table XLV. One animal consuming the experimental diet had unphysiologically high concentrations of plasma urea nitrogen. This was the sheep that consumed less of the experimental diet than did the other two sheep assigned to this diet. Urea levels in this animal were not, however, above the bovine upper limit plasma urea nitrogen concentration of 45 mg per 100 ml reported by Campbell and Watts (1970) Vet. Res., 87:127. Previous studies by Daniels et al. (1971), J. Anim Sci., 32:348 and Webb et al. (1972), J. Anim Sci., 35:1263, demonstrated that plasma urea nitrogen levels in ruminants fed diets containing nonprotein nitrogen increased after feeding. This increase would be expected because the urea cycle in the ruminants would have to convert the extra blood $NH_3$ resulting from nonprotein nitrogen feeding into urea. Such an increase in plasma urea levels after feeding was not observed in the present study. Increases in plasma $NH_3$ concentrations after feeding in the present study were not as great, however, as those in the studies just mentioned. The relatively small excess of plasma $NH_3$ that resulted from feeding low levels of nonprotein nitrogen in this study was apparently converted to urea without substantially changing plasma urea levels. Sheep consuming experimental diets had both lower and higher plasma urea concentrations than those consuming corresponding control diets. No conclusions regarding the effect of either diet on plasma urea levels can be reached. The experimental animal with very high plasma urea concentrations was consuming his diet poorly during this period, and was losing weight. This sheep may have been in negative nitrogen balance, and conversion of body tissue to urea would account for the unusually high plasma urea nitrogen levels observed.

were fed. As mentioned earlier, only two pairs of animals were used during this second sampling period, because one sheep consumed the control diet very poorly. Data for this sheep and his partner are not reported.

Rumen fluid $NH_3$ and pH, and plasma $NH_3$ and urea concentrations in sheep consuming the diets containing lower levels of untreated or chlorinated, ammoniated stover are presented, as a function of time after feeding, in Tables XLVI through XLVIII. Although the experimental animal consuming the larger amount of nitrogen had a much higher concentration of rumen $NH_3$ than the control sheep, the rumen pH drop that occurred after this animal consumed his diet prevented the early increase in plasma $NH_3$ levels that accompanied the consumption of the stover-urea diet by the control animal. This combination of an increase in plasma $NH_3$ and an immediate decrease in rumen pH after feeding was also observed in the other experimental animal in this study. The comparatively high rumen pH in this sheep, when compared to the control animal, may have allowed more $NH_3$ to cross the rumen wall. The increased contribution to plasma $NH_3$ from this source may, in turn, have caused plasma $NH_3$ levels in control and experimental animals to be nearly the same at all sampling periods, even though rumen $NH_3$ levels in the experimental sheep were lower than those in the control at times less than two hours after feeding. The rise in plasma $NH_3$ concentrations in the experimental animal at times between three and four hours after feeding may have been due to the increase in rumen $NH_3$ that occurred between two and three hours after feeding.

TABLE XLV

PLASMA UREA NITROGEN LEVELS (MG PER 100 ML) IN SHEEP FED HIGH STOVER CONTROL AND EXPERIMENTAL DIETS

| | Animal Number | | | | | |
|---|---|---|---|---|---|---|
| | $RC^b$ | $RD17^c$ | $4811^b$ | $4731^c$ | $E16^b$ | $MRX^c$ |
| Time (hr) | Nitrogen Consumed$^a$ | | | | | |
| | 0.066 | 0.070 | 0.052 | 0.049 | 0.097 | 0.010 |
| 0 | 11.94 ± 0.05$^d$ | 31.44 ± 0.21$^e$ | 13.85 ± 0.20$^d$ | 20.14 ± 0.15$^e$ | 23.56 ± 2.28$^e$ | 12.51 ± 0.05$^d$ |
| 0.5 | 13.34 ± 0$^d$ | 31.39 ± 0.26$^e$ | 13.87 ± 0.35$^d$ | 20.43 ± 0.15$^e$ | 21.82 ± 0.24$^e$ | 12.43 ± 0.15$^d$ |
| 1.0 | 13.97 ± 0.16$^d$ | 33.27 ± 0.28$^e$ | 13.38 ± 0.14$^d$ | 19.48 ± 0.66$^e$ | 21.92 ± 0.24$^e$ | 12.83 ± 0.15$^d$ |
| 1.5 | 14.80 ± 0.20$^d$ | 33.11 ± 0.15$^e$ | 13.64 ± 0.16$^d$ | 20.33 ± 0.35$^e$ | 21.65 ± 0.35$^e$ | 12.97 ± 0.43$^d$ |
| 2.0 | 14.79 ± 0.20$^d$ | 33.09 ± 0.42$^e$ | 14.67 ± 0.13$^d$ | 21.42 ± 0.54$^e$ | 21.69 ± 0.46$^e$ | 13.48 ± 0.05$^d$ |
| 2.5 | 13.79 ± 0.31$^d$ | 31.36 ± 0.26$^e$ | 16.09 ± 0.12$^d$ | 21.21 ± 0.55$^e$ | 20.14 ± 0.08$^e$ | 12.78 ± 0.17$^d$ |
| 3.0 | 13.89 ± 0$^d$ | 31.62 ± 0$^e$ | 15.06 ± 0.33$^d$ | 23.42 ± 4.43$^d$ | 21.53 ± 0.47$^e$ | 12.93 ± 0.43$^d$ |
| 4.0 | 15.46 ± 0.12$^d$ | 33.72 ± 0.66$^e$ | 15.65 ± 0.28$^d$ | 20.73 ± 0.25$^e$ | 20.44 ± 0.14$^e$ | 12.99 ± 0.13$^d$ |
| 5.0 | 14.27 ± 0.26$^d$ | 32.20 ± 0.55$^e$ | 14.81 ± 0.67$^d$ | 20.41 ± 0.28$^e$ | 21.60 ± 0.44$^e$ | 13.47 ± 0.32$^d$ |
| 6.0 | 13.96 ± 0.16$^d$ | 35.02 ± 0.60$^e$ | 16.09 ± 0.39$^d$ | 20.67 ± 0.57$^e$ | 22.19 ± 0.10$^e$ | 13.55 ± 0.17$^d$ |

$^a$Grams of nitrogen consumed per kilogram of body weight per feeding period.
$^b$Consumed the control diet of Table XIV.
$^c$Consumed the experimental diet of Table XIV. $^{d,e}$Mean values that do not have a common letter in the superscript, within each pair consuming the same amount of nitrogen, are different (P < 0.05). Mean and sample standard deviation of triplicate determinations.

At the conclusion of the feeding trial just described, sheep that had been consuming the diets described in Table XIV were adapted to the diets of Table XV. Blood and rumen fluid sampling and analysis procedures after adaptation to the lower levels of untreated and treated stover in the Table XV diets were identical to those used when the high stover diets of Table XIV Plasma $NH_3$ concentrations in this study were, in general, considerably lower than those in the previous study. As noted in the previous study, changes in rumen $NH_3$ levels after feeding were more gradual in sheep fed experimental diets than in those consuming control diets.

TABLE XLVI

RUMEN AMMONIA LEVELS (MG PER 100 ML) IN SHEEP FED LOW STOVER CONTROL AND EXPERIMENTAL DIETS

| Animal No. | Nitrogen Consumed$^a$ | Time (hr) | | | | | | | |
|---|---|---|---|---|---|---|---|---|---|
| | | 0 | 0.5 | 1.0 | 1.5 | 2.0 | 2.5 | 3.0 | 4.0 |
| 4731$^b$ | 0.119 | 9.12 ± 0.03$^d$ | 31.17 ± 0.47$^d$ | 27.03 ± 0.12$^d$ | 21.31 ± 0.18$^d$ | 19.11 ± 1.03$^d$ | 14.67 ± 0.09$^d$ | 12.21 ± 0.29$^d$ | 12.35 ± 0.14$^d$ |
| 4811$^c$ | 0.117 | 49.37 ± 0.74$^e$ | 65.63 ± 1.44$^e$ | 70.63 ± 1.27$^e$ | 65.63 ± 2.36$^e$ | 65.97 ± 1.26$^e$ | 59.93 ± 0.46$^e$ | 57.57 ± 0.61$^e$ | 47.63 ± 0.51$^e$ |

TABLE XLVI-continued
RUMEN AMMONIA LEVELS (MG PER 100 ML) IN SHEEP FED LOW STOVER CONTROL AND EXPERIMENTAL DIETS

| Animal No. | Nitrogen Consumed[a] | Time (hr) | | | | | | | |
|---|---|---|---|---|---|---|---|---|---|
| | | 0 | 0.5 | 1.0 | 1.5 | 2.0 | 2.5 | 3.0 | 4.0 |
| MRX[b] | 0.093 | 35.87 ± 0.29[e] | 54.30 ± 0.87[e] | 51.73 ± 0.74[e] | 47.30 ± 0.46[e] | 41.90 ± 0.17[e] | 38.20 ± 0.50[d] | 35.43 ± 0.46[d] | 26.29 ± 0.31[d] |
| E16[c] | 0.097 | 29.11 ± 0.66[d] | 41.13 ± 0.74[d] | 45.00 ± 0.60[d] | 44.40 ± 0.30[d] | 40.23 ± 0.40[d] | 41.90 ± 0.17[e] | 43.10 ± 0.17[e] | 41.33 ± 0.40[e] |

[a]Grams of nitrogen consumed per kilogram of body weight per feeding period.
[b]Consumed the control diet of Table XV.
[c]Consumed the experimental diet of Table XV.
[d, e]Mean values that do not have a common letter in the superscript, within each pair consuming the same amount of nitrogen, are different ($P < 0.05$). Mean and sample standard deviation of triplicate determinations.

TABLE XLVII
PLASMA AMMONIA LEVELS (MG PER 100 ML) IN SHEEP FED LOW STOVER CONTROL AND EXPERIMENTAL DIETS

| | Animal Number | | | |
|---|---|---|---|---|
| | 4731[b] | 4811[c] | MRX[b] | E16[c] |
| | Nitrogen Consumed[a] | | | |
| Time (hr) | 0.119 | 0.117 | 0.093 | 0.097 |
| 0 | 0.268 ± 0.008[d] | 0.342 ± 0.023[e] | 0.413 ± 0.008[e] | 0.393 ± 0.011[d] |
| 0.5 | 0.264 ± 0.011[d] | 0.342 ± 0.014[e] | 0.397 ± 0.044[d] | 0.398 ± 0.034[d] |
| 1.0 | 0.283 ± 0.020[d] | 0.322 ± 0.007[e] | 0.392 ± 0.042[d] | 0.415 ± 0.025[d] |
| 1.5 | 0.303 ± 0.013[d] | 0.298 ± 0.004[d] | 0.417 ± 0.004[d] | 0.406 ± 0.026[d] |
| 2.0 | 0.263 ± 0[d] | 0.327 ± 0.004[e] | 0.420 ± 0.028[d] | 0.424 ± 0.017[d] |
| 2.5 | 0.292 ± 0.008[d] | 0.335 ± 0.011[e] | 0.400 ± 0.022[d] | 0.384 ± 0.033[d] |
| 3.0 | 0.283 ± 0.013[d] | 0.338 ± 0.020[e] | 0.384 ± 0.008[d] | 0.393 ± 0.011[d] |
| 4.0 | 0.303 ± 0.020[d] | 0.338 ± 0.008[d] | 0.402 ± 0.018[d] | 0.450 ± 0.012[e] |
| 5.0 | 0.312 ± 0.049[d] | 0.326 ± 0.008[d] | 0.402 ± 0.023[d] | 0.381 ± 0.007[d] |
| 6.0 | 0.301 ± 0.026[d] | 0.344 ± 0.010[d] | 0.397 ± 0.037[d] | 0.393 ± 0.027[d] |

[a]Grams of nitrogen consumed per kilogram of body weight per feeding period.
[b]Consumed the control diet of Table XV.
[c]Consumed the experimental diet of Table XV. [d, e]Mean values that do not have a common letter in the superscript, within each pair consuming the same amount of nitrogen, are different ($P < 0.05$). Mean and sample standard deviation of triplicate determinations.

TABLE XLVIII
PLASMA UREA NITROGEN LEVELS (MG PER 100 ML) IN SHEEP FED LOW STOVER CONTROL AND EXPERIMENTAL DIETS

| | Animal Number | | | |
|---|---|---|---|---|
| Time (hr) | 4731[b] | 4811[c] | MRX[b] | E16[c] |
| | 0.119 | 0.117 | 0.093 | 0.097 |
| 0 | 11.91 ± 0.41[d] | 14.85 ± 0.39[e] | 19.32 ± 0.27[e] | 12.61 ± 0.33[d] |
| 0.5 | 12.40 ± 0.62[d] | 15.12 ± 0.74[e] | 18.94 ± 0.07[e] | 13.76 ± 0.15[d] |
| 1.0 | 12.33 ± 0.10[d] | 15.30 ± 0.43[e] | 20.25 ± 0.54[e] | 13.53 ± 0.58[d] |
| 1.5 | 11.94 ± 0.24[d] | 15.86 ± 0.18[e] | 20.38 ± 0.71[e] | 14.12 ± 0.77[d] |
| 2.0 | 12.28 ± 0.22[d] | 17.07 ± 0.41[e] | 20.96 ± 0.58[e] | 15.03 ± 0.98[d] |
| 2.5 | 12.96 ± 0.35[d] | 16.12 ± 0.22[e] | 21.17 ± 1.10[e] | 15.72 ± 0.28[d] |
| 3.0 | 12.67 ± 0.35[d] | 16.61 ± 0.57[e] | 21.67 ± 0.40[e] | 16.14 ± 0.55[d] |
| 4.0 | 12.98 ± 0.35[d] | 16.54 ± 0.35[e] | 21.30 ± 0.24[e] | 16.25 ± 0.79[d] |
| 5.0 | 12.56 ± 0.52[d] | 17.15 ± 0.13[e] | 20.57 ± 0.37[e] | 16.17 ± 0.08[d] |
| 6.0 | 12.58 ± 0.67[d] | 18.12 ± 0.49[e] | 19.70 ± 0.29[e] | 16.11 ± 0.15[d] |

[a]Grams of nitrogen consumed per kilogram of body weight per feeding period.
[b]Consumed the control diet of Table XV.
[c]Consumed the experimental diet of Table XV.
[d, e]Mean values that do not have a common letter in the superscript, within each pair consuming the same amount of nitrogen, are different ($P < 0.05$). Mean and sample standard deviation of triplicate determinations.

The reason for very high rumen $NH_3$ concentrations and concomitant high plasma $NH_3$ levels in one experimental animal is not known. An experimental animal in the previous study also developed high rumen $NH_3$ levels after feeding, but plasma $NH_3$ levels were not affected because the rumen pH was so low. In the present study, plasma $NH_3$ concentrations in this experimental sheep initially decreased, presumably due to a drop in rumen pH after feeding. After several hours, however, rumen pH and plasma $NH_3$ began to increase until plasma $NH_3$ levels were significantly higher in the experimental animal than in the control. Perhaps, as discussed earlier, rumen microbes were extensively converting dietary nitrogen to $NH_3$ in the rumen of this experimental sheep. In the present case, however, the rumen buffering capacity of this experimental animal was apparently not great enough to prevent the passage of $NH_3$ from the rumen into the blood stream in amounts large enough to raise plasma $NH_3$ levels above those in the control animal.

Plasma urea nitrogen data was again variable in this study. Sheep fed experimental diets had nearly the same plasma urea levels at all times after feeding, but control animals had both the highest and the lowest plasma urea nitrogen concentrations at all times after feeding. Again in this study, there was no increase in plasma urea nitrogen concentrations after feeding the diets containing nonprotein nitrogen.

In summary, data from these $NH_3$ toxicity studies with sheep indicate that a diet containing relatively high levels of chlorinated, ammoniated stover was consumed poorly by two of the three sheep assigned to the diet. When the level of treated stover in this diet was decreased, feed consumption increased, which suggested that sheep disliked the taste of the treated stover. Rumen and plasma $NH_3$ concentrations after sheep consumed diets containing chlorinated, ammoniated stover were sometimes higher and sometimes lower than concentrations of these metabolites in animals consuming control diets. These results differ from those of in vitro studies reported earlier which showed a consistently lower level of free $NH_3$ in incubation mixtures containing chlorinated, ammoniated stover than in mixtures containing equivalent amounts of nitrogen from untreated stover plus various nonprotein nitrogen sources. Perhaps, in those cases where rumen $NH_3$ levels were high, the sheep that had been consuming the diet containing treated stover developed a rumen microbial population that could readily degrade the treated stover to $NH_3$ and other fermentation products. Alternatively, experimental animals that had low rumen $NH_3$ levels might have been better able to use the $NH_3$ in chlorinated, ammoniated stover for microbial protein synthesis, compared to control sheep utilization of $NH_3$ from the stover-urea mixtures. Nevertheless, the consistent rumen pH drop that occurred shortly after feeding diets containing chlorinated, ammoniated stover to sheep, and the more constant ruminal $NH_3$ release rate in these animals, should be beneficial to them in preventing $NH_3$ toxicity and in optimizing rumen microbial protein synthesis. Diets containing even lower levels of treated stover than those used in the present study could be fed to sheep or other ruminants to determine whether or not these diets would improve feed consumption or dietary nitrogen utilization by these animals. It is important to observe that the chlorinated, ammoniated stover was higher in crude protein, it was eaten by the ruminant animals and no untoward toxicity symptoms were produced.

In view of the above, it will be seen that the several objects of the invention are achieved and other advantageous results attained.

As various changes could be made in the above products and processes without departing from the scope of the invention, it is intended that all matter contained in the above description shall be interpreted as illustrative and not in a limiting sense.

What is claimed is:

1. A process for increasing the crude protein content of a ruminant animal feedstuff of relatively low crude protein content comprising the steps of first subjecting the animal feedstuff to chemical treatment with chlorine gas to form an increased concentration of carbonyl groups in said feedstuff and then subjecting the chlorinated feedstuff to chemical treatment with ammonia gas for a time sufficient to react said ammonia with said carbonyl groups to produce a ruminant animal feedstuff of substantially increased crude protein content, both the chlorination and ammoniation steps being carried out in the presence of a mixture of the ruminant animal feedstuff and water, said mixture containing approximately 25% to 35% feedstuff and approximatey 65% to 75% water.

2. A process as set forth in claim 1 wherein the treated feedstuff is dried after being subjected to chlorination and ammoniation.

3. A process as set forth in claim 1 wherein the animal feedstuff is corn stover.

4. A process as set forth in claim 1 wherein the animal feedstuff is wheat straw.

5. In a process for increasing the crude protein content of a ruminant animal feedstuff by subjecting it to treatment with ammonia, the improvement which comprises first subjecting the animal feedstuff to chemical treatment with chlorine gas to form an increased concentration of carbonyl groups in said feedstuff prior to subjecting the feedstuff to treatment with ammonia, said treatment being carried out for a time sufficient to substantially increase the crude protein content of the feedstuff, both the chlorination and ammoniation steps being carried out in the presence of a mixture of the ruminant animal feedstuff and water, said mixture containing approximately 25% to 35% feedstuff and approximately 65% to 75% water.

6. A process as set forth in claim 5 wherein the treated feedstuff is dried after being subjected to chlorination and ammoniation.

7. A process as set forth in claim 5 wherein the animal feedstuff is corn stover.

8. A process as set forth in claim 5 wherein the animal feedstuff is wheat straw.

* * * * *